(12) United States Patent
Ueki et al.

(10) Patent No.: US 8,271,756 B2
(45) Date of Patent: Sep. 18, 2012

(54) CONTENT APPROVING APPARATUS

(75) Inventors: Satoshi Ueki, Tokyo (JP); Teruaki Tanaka, Tokyo (JP); Tatsuya Deji, Tokyo (JP); Yuuko Akamine, Tokyo (JP); Koushiro Kumagai, Tokyo (JP); Kenji Ito, Tokyo (JP); Sunao Todagishi, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 186 days.

(21) Appl. No.: 12/659,985

(22) Filed: Mar. 26, 2010

(65) Prior Publication Data

US 2011/0078399 A1     Mar. 31, 2011

(30) Foreign Application Priority Data

Sep. 25, 2009   (JP) .................................. 2009-220608

(51) Int. Cl.
  *G06F 12/00*  (2006.01)
  *G06F 13/00*  (2006.01)
  *G06F 13/28*  (2006.01)
(52) U.S. Cl. ........................................ 711/163; 711/164
(58) Field of Classification Search .................. None
  See application file for complete search history.

(56) References Cited

U.S. PATENT DOCUMENTS

| 7,660,959 B2 * | 2/2010 | Asher et al. | 711/164 |
| 2004/0049648 A1 * | 3/2004 | Sato et al. | 711/164 |
| 2006/0288183 A1 * | 12/2006 | Boaz et al. | 711/164 |
| 2007/0288993 A1 * | 12/2007 | Sakai et al. | 726/2 |

FOREIGN PATENT DOCUMENTS

| EP | 0 974 917 A2 | 1/2000 |
| EP | 1 626 327 A1 | 2/2006 |
| JP | 2001-230802 | 8/2001 |
| JP | 2007-281622 | 10/2007 |
| WO | WO 02/082271 A1 | 10/2002 |
| WO | WO 03/105148 A2 | 12/2003 |
| WO | WO 2004/070558 A2 | 8/2004 |
| WO | WO 2005/038800 A2 | 4/2005 |
| WO | WO 2009/017710 A1 | 2/2009 |

OTHER PUBLICATIONS

Extended European Search Report Communication issued by the European Patent Office on Feb. 3, 2011 in Application No. 10158167.6-2212 (3 pages).

* cited by examiner

*Primary Examiner* — Yaima Campos
(74) *Attorney, Agent, or Firm* — Stites & Harbison, PLLC; Juan Carlos A. Marquez, Esq

(57) ABSTRACT

The present invention aims to provide an apparatus capable of determining whether or not content is permitted to be taken out, by managing contents permitted to be taken out. One aspect of the invention is characterized by comprising: a storage means that stores therein taking-out-permitted-content identification data which is data generated on the basis of a part or entirety of each content permitted to be taken out; and a generating means that generates the taking-out-permitted-content identification data. Another aspect of the present invention is characterized by comprising: a storage means that stores therein taking-out-permitted-content identification data which is data generated on the basis of a part or entirety of each content permitted to be taken out to the outside; and an approving means that determines whether a content is permitted to be taken out, with reference to the taking-out-permitted-content identification data.

6 Claims, 14 Drawing Sheets

CONTENT APPROVING APPARATUS

TECHNICAL FIELD

The present invention relates to a content approving apparatus that enables determination as to whether or not content is permitted to be taken out to the outside.

BACKGROUND ART

In recent years, there have frequently occurred incidents of information leakage when a portable storage medium (portable medium) such as a USB (universal serial bus) memory or a CD (compact disc) where a file having business secret or personal information is copied is lost or stolen after being taken out. Occurrence of such incidents is a social problem.

In order to prevent such information leakage, Patent literature 1 discloses a technology for automatically encrypting and storing a file in a portable medium for making a copy of the file in the medium. That is, by having the file thus encrypted and stored, a person who does not know a decryption key is prohibited from seeing the stored information even in a case where loss or the like of the portable medium occurs. Thereby, a risk of information leakage can be reduced.

Additionally, in order to prevent information leakage from e-mails, Patent literature 2 discloses a technology with which: an e-mail transmitted by a client PC (personal computer) or the like is received on a network; an encrypted e-mail is created by encrypting a text body and an attached file of the received e-mail; and the encrypted e-mail is transmitted to a transmission destination of the original e-mail. That is, even in the case where the e-mail is intercepted on the network, the above encryption makes it impossible for a person who does not know a decryption key to see information stored in the e-mail. Thereby, a risk of information leakage can be reduced.

Furthermore, a so-called mail filtering technology is well known. The mail filtering technology prohibits transmission of an e-mail by determining, for example, whether or not a text body or an attached file of the e-mail contains any predetermined term (for example, "strictly confidential", or "personal information"), from which a risk of information leakage is predicted.

CITATION LIST

Patent Literature

[Patent Literature 1] JP Patent Publication (Kokai) No. 2001-230802 A
[Patent Literature 2] JP Patent Publication (Kokai) No. 2007-281622 A

SUMMARY OF INVENTION

However, the technologies disclosed in Patent Literatures 1 and 2 and the mail filtering technology can reduce risks of information leakage but cannot prevent intentional information leakage. For example, the technologies disclosed in Patent Literatures 1 and 2 cannot prevent, for example, a person who knows an encryption key from transmitting an e-mail including in-office confidential information to his/her home, and then transmitting the information to a third party after decrypting the information at home. Additionally, in a case where a person encrypts in-office confidential information by himself/herself and then attaches the information to an e-mail, even the mail filtering technology cannot determine whether or not the attached file of the e-mail contains any predetermined term, from which a risk of information leakage is predicted.

Accordingly, what is truly required is to previously manage contents (such as files) permitted to be taken out, and to prohibit unmanaged contents from being taken out.

Technical Problems

An object of the present invention is to provide an apparatus capable of determining whether or not content is permitted to be taken out, by managing contents permitted to be taken out.

Solution to Problems

In order to achieve the above object, the content approving apparatus according to the present invention comprises: a storage means that stores therein taking-out-permitted-content identification data, which is data generated on the basis of a part or entirety of content permitted to be taken out; and a generating means that generates the taking-out-permitted-content identification data.

Advantageous Effect of Invention

According to the present invention, there can be provided an apparatus that can determine, by managing contents permitted to be taken out, whether or not content is permitted to be taken out.

DESCRIPTION OF EMBODIMENTS

A first embodiment of the present invention in cases of carrying out the present invention will be described below in detail with reference to the drawings.

Note that, an "e-mail" will be abbreviated as a "mail" in the following description and the drawings. Additionally, unless particularly stated otherwise, "content" means all pieces of electronic data available for browsing, looking and listening, transmitting and receiving by mail, or copying or the like to an external storage medium, the pieces including not only files such as document files and image files but also records on databases. Furthermore, a "secure content" means any one content, among the contents, which is made difficult to browse, look and listen, and so on by being subjected to some approach such as encryption.

Figure 1:
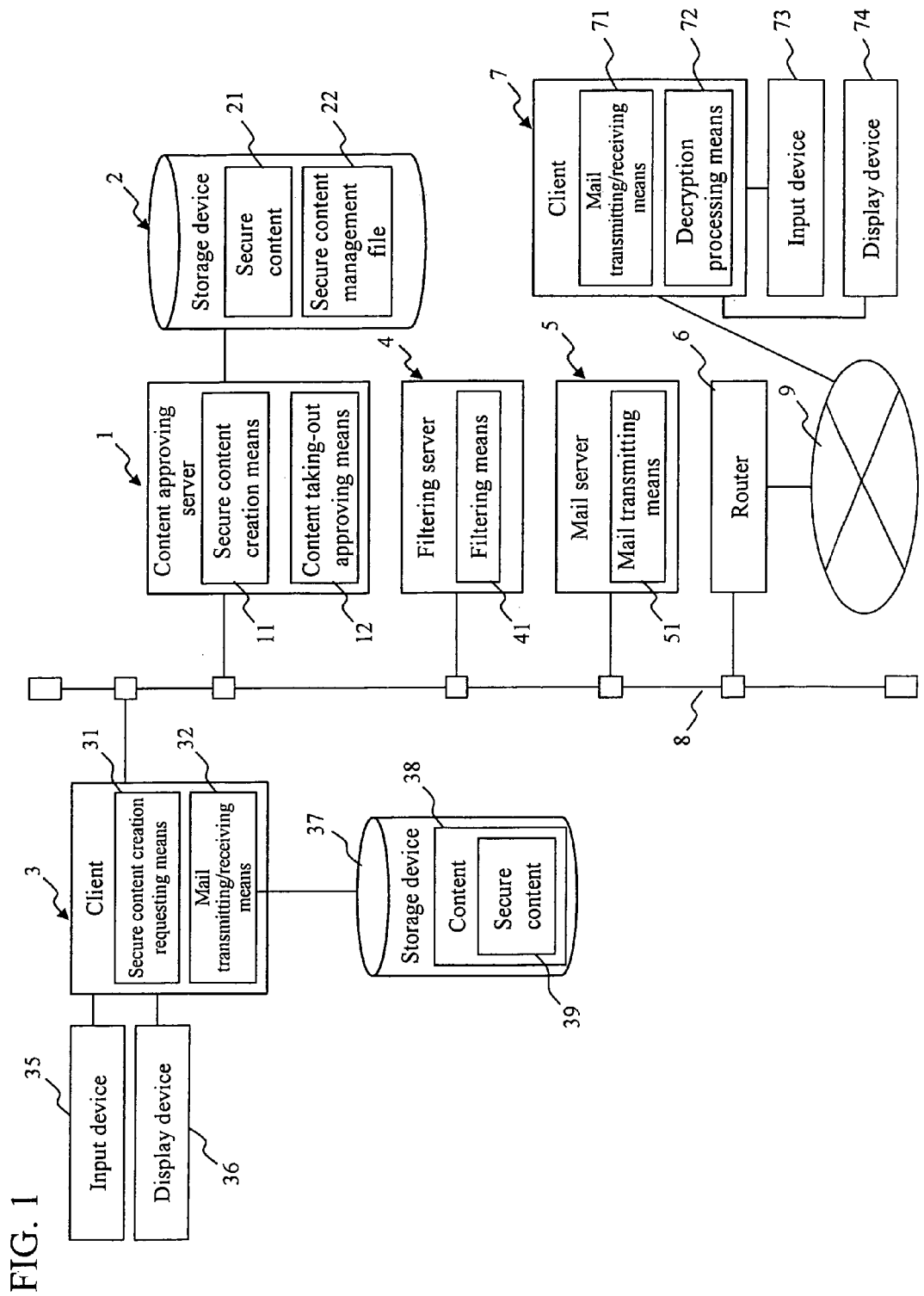
FIG. 1 is a system configuration diagram of a content approving system in a first embodiment according to the present invention.

FIG. 1 is a system configuration diagram of a content approving system in a first embodiment according to the present invention.

<Entire Configuration and Function of Content Approving System>

The content approving system in the first embodiment according to the present invention is a system in which apparatuses are mutually communicably connected to one another through a cabled or radio communication line, the apparatuses being a content approving server 1, a client 3, a filtering server 4, a mail server 5, a router 6, and a client 7.

Note that, although a single unit of apparatus is illustrated in the drawings for each of the abovementioned apparatuses, two or more units of apparatuses may exist for each of the apparatuses. Additionally, it is not necessary that a single unit of apparatus should correspond to each one of the abovementioned apparatuses, and, for example, a single unit of apparatus can alternatively be configured to be provided with functions of both of the filtering server 4 and the mail server 5. Furthermore, plural means (for example, a secure content creating means 11 and a content taking-out approving means 12) included in a single unit of apparatus in FIG. 1 can alternatively be provided separately in different units of apparatuses.

Although the content approving server 1, the client 3, the filtering server 4, the mail server 5 and the router 6 are mutually communicably connected via a LAN (Local Area Network) 8 in FIG. 1, a method for the connection is not limited to use of a LAN. The connection may be implemented via a WAN (Wide Area Network), for example.

Note that, although the client 7 is connected to the LAN 8 via the Internet 9 in FIG. 1, a method for the connection is not limited to use of the Internet. For example, there is no problem in employing a configuration where, with the client 7 being connected to a LAN different from the LAN 8, the router 6 connects these LANs to each other.

With the above described configuration, a mail transmitted by the client 3 toward the client 7 can be received by the filtering server 4 first, the filtering server 4 can transmit the received mail to the mail server 5 after making an inquiry to the content approving sever 1 about whether or not transmission of a content attached to the mail is permitted, and the mail server 5 can transmit the thus received mail to the client 7 via the router 6.

That is, without having the client 3 perform any particular processing when transmitting mails, whether or not transmission of contents attached to the respective mails is permitted is automatically determined, whereby only contents permitted to be transmitted can be transmitted to destinations of the mails. Note that, in the process of the above described processing, the client 3, the client 7, the filtering server 4, the mail server 5 and the router 6 store, if necessary, the transmitted and received mail in main memories or the like, which are not illustrated in the drawings but are included in these respective apparatuses.

<Configuration and Function of Each Apparatus of Content Approving System>

By focusing on mails transmitted by the client 3, configurations and functions of the respective apparatuses will be described in accordance with operational sequences in transmitting and receiving the mails.

<Configuration and Function of Client 3>

The client 3 is an apparatus such as a PC (Personal Computer), and is communicably connected to an input device 35, a display device 36 and a storage device 37. The input device 35 is a device such as a keyboard or a mouse. By operating the input device 35, an operator of the client 3 can give an instruction on processing that should be executed by the client 3.

The display device 36 is an apparatus such as a liquid crystal display or a printer, and displays or prints out outputs such as a result of processing executed by the client 3.

The storage device 37 is an apparatus such as a magnetic disk, and is built-in inside the client 3 or connected to the client 3 from outside. There are contents 38 stored in the storage device 37, the contents 38 including secure contents 39.

Although not being illustrated in the drawings, a CPU (Central Processing Unit) and a main memory are included in the client 3. The CPU loads various programs (for example, a mail transmission/reception program) into the main memory and executes various kinds of processing by executing instruction codes in the programs. The same applies not only to the client 3 but also to the filtering server 4, the mail server 5, the content approving server 1, and the client 7.

Technologies related to the above described program execution are publicly known. Therefore, for the purpose of avoiding complication of description related to the program execution in the respective drawings and the following description, each of the various programs is described therein as if there is hardware with respect to the each program, and as if each means executes processing. For example, the mail transmission/reception program will be described as a mail transmitting/receiving means 32. Note that each means (for example, the mail transmitting/receiving means 32) can actually be configured as an electronic device, or as a combination of an electronic device and firmware.

The client 3 includes a secure content creation requesting means 31 and the mail transmitting/receiving means 32.

The secure content creation requesting means 31 (a secure content creation requesting program) requests the content approving server 1 to perform encryption or the like on contents specified by the operator of the client 3 by use of the input device 35, and stores in the storage device 37 the secure contents 39 that are obtained by subjecting the contents to encryption or the like.

The mail transmitting/receiving means 32 is, as described above, a mail transmission/reception program, and is a so-called mailer (an e-mail client). The mail transmitting/receiving means 32 is set up so as to transmit a transmitted mail to the filtering server 4 first. Such setup is made possible, for example, by setting an IP (Internet Protocol) address of the filtering server 4 as a transmission server when an environment for the mail transmission/reception program is set up.

Note that the term "contents 38" is no more than a collective term for an entirety of contents stored in the storage device 37, and there is no need to comprise particular files or databases named "contents 38." Likewise, the term "secure contents 39" is no more than a collective term for an entirety of secure contents on which processing such as encryption is already preformed by the content approving server 1, and there is no need to comprise particular files or databases named "secure contents 39."

<Configuration and Functions of Filtering Server 4>

The filtering server 4 is an apparatus such as a PC, and includes a filtering means 41.

The filtering means 41 is a filtering program. As in the case of a general filtering program, the filtering means 41 receives mails from the client 3, then determines, by determining whether or not any predetermined term (for example, "strictly confidential" or "personal information"), from which a risk of information leakage is predicted, is contained in a text body or the like of each of the thus received mails, whether or not transmission of the mails is permitted, and then transmits to the mail server 5 mails determined as being permitted to be transmitted.

In addition to performing the above function, the filtering means 41 according to the present invention determines whether each mail received from the client 3 has any content attached thereto (hereinafter referred to as "attached content" in the following description for the sake of unification of terminology although a content attached to a mail is generally called an attached file). The filtering means 41 then makes an inquiry to the content approving sever 1 about whether or not transmission of the content attached to the mail is permitted, and then transmits the mail to the mail server 5 only if the content approving server 1 responds that transmission is permitted. Note that, this function will be described later in detail with reference to a flowchart.

<Configuration and Functions of Mail Server 5>

The mail server 5 is an apparatus such as a PC, and includes a mail transmitting means 51.

The mail transmitting means 51 is a mail transmission program, which is, for example, an SMTP (Simple Mail Transfer Protocol) server (program). The mail transmitting means 51 transmits a mail received from the filtering server 4 to a transmission destination (for example, the client 7) of the mail.

Note that, since an example of the mail server 5 including the above described function is well known, the mail server 5 will not be described further.

<Configuration and Functions of Router 6>

The router 6 transmits, to the Internet 9, a mail transmitted to an apparatus other than apparatuses connected to the LAN 8. Conversely, the router 6 is needed only to be an apparatus having such a function, and is not needed to be a router.

Although not being illustrated in the drawings, the mail transmitted to the Internet 9 is received by a transmission destination (for example, the client 7) via various communication apparatuses.

<Configuration and Functions of Client 7>

The client 7 is an apparatus such as a PC as in the case of the client 3, and is communicably connected to an input device 73 and a display device 74. The input device 73 is a device such as a keyboard or a mouse. By operating the input device 73, an operator of the client 7 can give an instruction on processing that should be executed by the client 7.

The display device 74 is an apparatus such as a liquid crystal display or a printer, and displays or prints out outputs such as a result of processing executed by the client 7. The client 7 includes a mail transmitting/receiving means 71 (a mail transmission/reception program) as in the case of the client 3, and the mail transmitting/receiving means 71 receives a mail whose transmission destination is the client 7.

Additionally, the client 7 includes a decryption processing means 72 (a decryption processing program). The decryption processing means 72 decrypts a content by use of a decryption key inputted from the input device 73 or the like, and then displays a result of the decryption on the display device 74, the content being attached to the received mail and obtained by subjecting a content to processing such as encryption.

<Configuration and Functions of Content Approving Server 1>

Although a configuration and functions of the content approving server 1 have been mentioned also in the above description, the configuration and functions will be collectively described here.

The content approving server 1 is an apparatus such as a PC, and is communicably connected to a storage device 2. The storage device 2 is a device such as a magnetic disk, and is built-in inside the content approving server 1 or connected thereto from outside. Note that the storage device 2 is not needed to be connected directly to the content approving server 1. For example, although not being illustrated in the drawings, another configuration may be employed where, with a file server, apart from the content approving server 1, being connected to the LAN 8, the storage device 2 is connected to this file server. The storage device 2 and the main memory or the like of the content approving server 1 function as a storage means of the content approving server 1 although the main memory or the like is not illustrated herein.

The content approving server 1 is an apparatus such as a PC, and includes the secure content creating means 11 (a secure content creation program) and the content taking-out approving means 12 (a content taking-out approval program). As a matter of course, a server including the secure content creating means 11 and a server including the content taking-out approving means 12 can be configured individually.

Upon receiving, from the secure content creation requesting means 31 of the client 3, a request that processing such as encryption be performed on a specified content, the secure content creating means 11 performs the processing such as encryption on the specified content, and then, at the same time as storing a corresponding one of the secure contents 21 in the storage device 2, transmits the one secure content 21 to the secure content creation requesting means 31, the one secure content 21 being obtained by performing the processing such as encryption on the specified content. Additionally, the secure content creating means 11 manages the secure contents 21 by storing file names and the like thereof in a secure content management file 22, the secure contents 21 being stored in the storage device 2.

Note that "secure contents 21" are no more than a collective name for an entirety of secure contents obtained by performing processing such as encryption on contents, and there is no need to comprise particular files or databases named "secure contents 21."

The content taking-out approving means 12 receives from the filtering means 41 of the filtering server 4 an inquiry about whether or not transmission of a content attached to a mail is permitted, then determines with reference to the secure content management file 22 or the like whether or not transmission of the content is permitted, and then transmits a result of the determination to the filtering means 41.

Functions of the secure content creating means 11 and the content taking-out approving means 12 will be described later with reference to flowcharts.

<Supplementary Description of Configuration and Functions of Content Approving System>

Next, supplementary description will be given of configurations and functions of the respective apparatuses by taking as an example a case where a mail is transmitted to the client 3.

The mail server 5 can further include a POP (Post Office Protocol) server (program). Otherwise, an apparatus, apart from the mail server 5, may be connected to the LAN 8, the apparatus including a POP server. In the case of employing this configuration, a mail received by the router 6 from the Internet 9 and addressed to the client 3 is transmitted to the mail server 5, and then, the POP server (program) of the mail server 5 transmits the thus received mail to the client 3 in response to a request from the mail transmitting/receiving means 32 of the client 3. The operator of the client 3 can cause the display device to display a text body and the like of the mail by operating the mail transmitting/receiving means 32 through the input device 35.

<Explanation on Data Configuration and Functions of Secure Content Management File 22>

Figure 2:
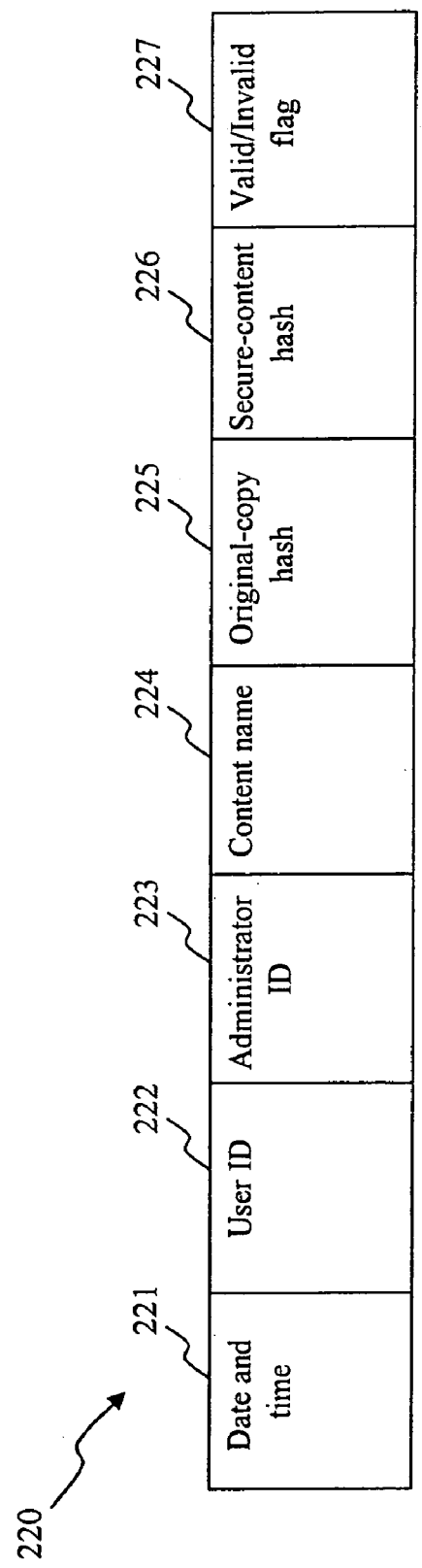
FIG. 2 is a data configuration diagram of a secure content management file in the first embodiment.

FIG. 2 is a data configuration diagram of the secure content management file 22.

Secure content management records 220 corresponding to the respective secure contents 21 are stored in the secure content management file 22. That is, every time the secure content creating means 11 creates one secure content 21, one secure content management record 220 is created. Accordingly, when there is none of the secure contents 21 created so far, none of the secure content management records 220 exists (in other words, no records corresponding to the secure content management records 220 exist).

Each of the secure content management records 220 consists of data items that are a date and time 221, a user ID 222, an administrator ID 223, a content name 224, an original-copy hash 225, a secure-content hash 226 and a valid/invalid flag 227.

In the dates and times 221, dates and times when the secure content producing means 11 creates the respective secure contents 21 are each set as, for example, "20081014131011" (13:01:11 on Oct. 14, 2008).

In the user IDs 222, IDs (Identifiers) of operators of the client 3 who request creation of the respective secure contents 21 are each set as, for example, "user1".

In the administrator IDs 223, IDs of predetermined administrators who approve creation of the respective secure contents 21 are each set as, for example, "admin1".

In the content names 224, file names or database record IDs of original contents, based on which the respective secure contents 21 are created, are set.

In the original-copy hashes 225, data pieces (for example, so-called hash values) generated based on parts or entireties of data matters of the original contents, based on which the respective secure contents 21 are created, are set. Various methods are known as methods for generating a hash value from content, and any one thereof may be selected as appropriate. Alternatively, for example, storing of the leading 200 bytes of each of the original contents may be performed instead of using a so-called hash function. That is, it is needed only to set therein values which make it possible to determine at a certain level of reliability that contents have the same matter.

In the secure-content hashes 226, data pieces (for example, so-called hash values) generated based on parts or entireties of data matters of the respective created secure contents 21 are set. As in the case of the original-copy hashes 225, various methods are known as methods for generating a hash value from content, and any one thereof may be selected as appropriate. Additionally, for example, storing of the leading 200 bytes of each of the original contents may be performed instead of using a so-called hash function. That is, it is needed only to set therein values with which make it possible to determine at a certain level of reliability that contents have the same matter.

Note that, in the following description, a data piece generated based on a part or an entirety of a data matter of each of the original contents, or based on a part or an entirety of a data matter of each of the secure contents 21 will be referred to as a "hash value" not only in a case where a so-called hash function is used, but also in a case where the leading 200 bytes are used.

As will be described later, the filtering means 41 of the filtering server 4 generates a hash value from a content attached to a mail, and transmits the hash value to the content taking-out approving means 12 of the content approving server 1. Then, the content taking-out approving means 12 permits transmission of the attached content if a value which coincides with the received hash value is set in any of the secure content hashes 226 of the content management records 220. Accordingly, although any method can be used as a method for generating a hash value from a secure content 21, this method has to be matched with a method used by the filtering means 41 for generating a hash value from content attached to a mail.

The valid/invalid flag 227 is a flag used to determine whether or not the secure content management records 220 concerned is valid. A value indicating "valid" or "invalid" is set therein (hereinafter, this value will be referred to as "valid" or "invalid"). If invalid is set in the valid/invalid flag 227, attachment of the secure contents 21 to a mail is prohibited, the secure contents 21 corresponding to the secure content management records 220 concerned.

<Explanation of Data Configuration of Mail>

Figure 3:
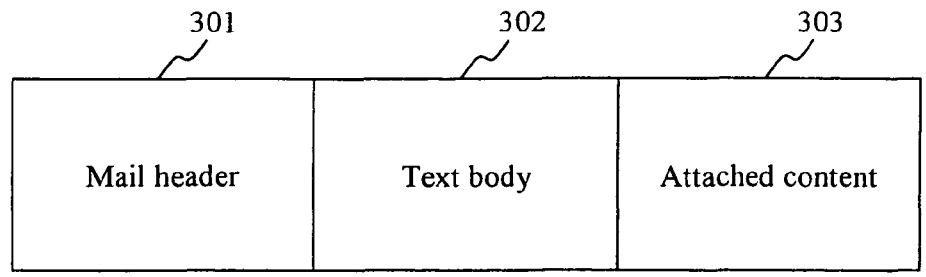
FIG. 3 is a data configuration diagram of a mail transmitted by a client in the first embodiment.

FIG. 3 is a data configuration diagram of a mail transmitted by the client 3.

As in the generally known cases, the mail is constituted of a mail header 301, a text body 302 and an attached content 303 (which is an "attached file" in general terms). The mail in some cases has none of the attached contents 303 attached thereto, and in some cases has two or more of the attached contents 303 attached thereto.

<Operations Performed by Content Approving System>

Description of the configurations and the functions of the content approving system in the first embodiment according to the present invention has been completed here. Operations performed by the content approving system in the first embodiment according to the present invention will be described below with reference to flowcharts.

<Operations Performed by Secure Content Creation>

Figure 4:
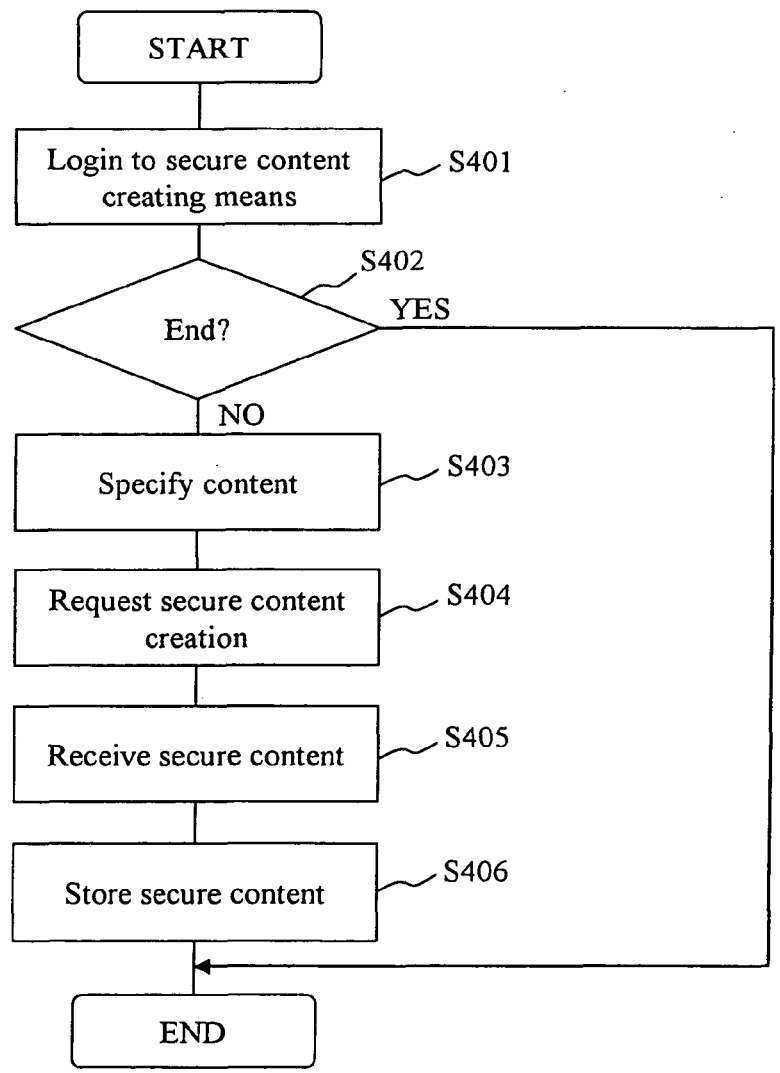
FIG. 4 is a flowchart showing operations performed by a secure content creation requesting means in the first embodiment.

FIG. 4 is a flowchart showing operations performed by the secure content creation requesting means 31.

An operator of the client 3 starts up the secure content creation requesting means 31 by operating the input device 35.

Upon starting processing, the secure content creation requesting means 31 displays a login screen on the display device 36, and transmits to the secure content creating means 11 a user ID or the like inputted by the operator of the client 3, and logins to the secure content creating means 11 (S401).

After the login to the secure content creating means 11, the secure content creation requesting means 31 performs the following processing until the operator of the client 3 gives an instruction for ending the processing (S402).

The secure content creation requesting means 31 displays on the display device 36 a massage that prompts specification of content (S403). Then, the secure content creation requesting means 31 transmits the contents 38 that is specified by the operator of the client 3, a content name (a file name, a database record ID or the like) of the specified content 38, and the like to the secure content creating means 11 together with the user ID inputted by the operator of the client 3, and thereby requests the secure content creating means 11 to create a secure content (S404).

Upon receiving a secure content from the secure content creating means 11 (S405), the secure content creation requesting means 31 stores in the storage device 37 the thus received secure content as one of the secure contents 39 (S406).

Figure 5:
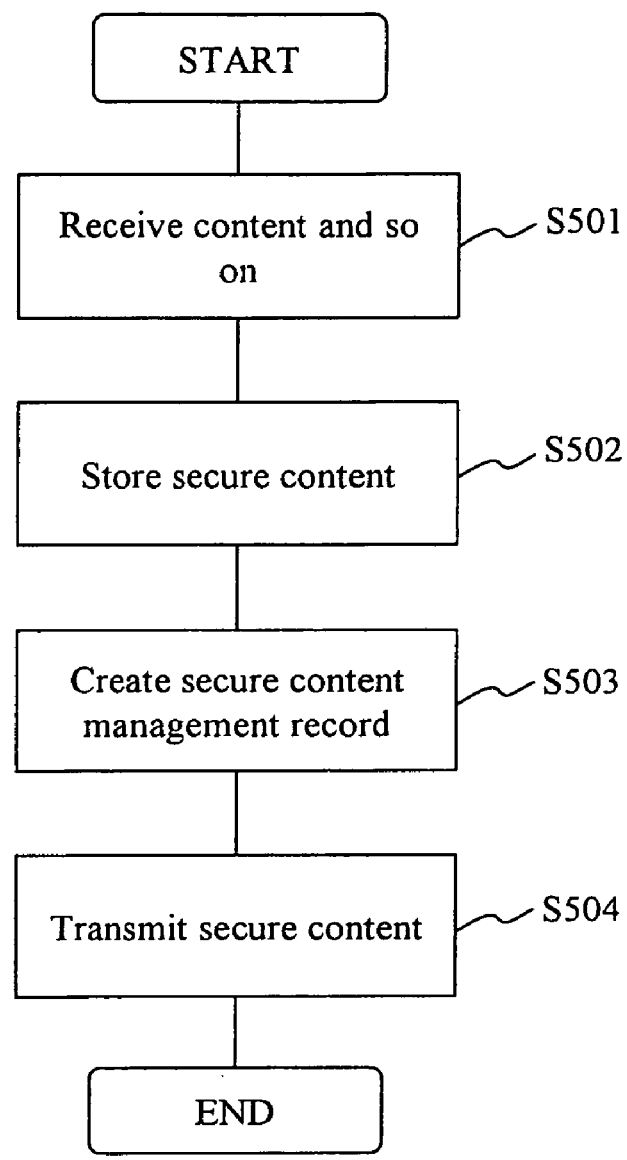
FIG. 5 is a flowchart showing operations performed by a secure content creating means in the first embodiment.

FIG. 5 is a flowchart showing operations performed by the secure content creating means 11. Note that, operations relating to the login from the client 3 do not differ from those in general login processing, and therefore description thereof will be omitted.

The secure content creating means 11 is started up when the content approving server 1 receives a request for creating a secure content from the secure content creation requesting means 31.

Upon starting processing, the secure content creating means 11 receives a user ID, the content and the content name that are transmitted by the secure content creation requesting means 31 (S501). Then, the secure content creating means 11 creates a secure content by performing processing, such as encryption, on the received content, and stores in the storage device 37 the thus created secure content as one of the secure contents 21 (S502).

Then, the secure content creating means 11 creates one of the secure content management records 220 and stores the created secure content management record 220 in the secure content management file 22 (S503). At this time, a date and time when the secure content creating means 11 creates the secure content is set in a corresponding one of the dates and times 221. The received user ID is set in the user ID 222. The received content name is set in the content name 224. Valid is set in the valid/invalid flag 227. Additionally, hash values are generated from the received content and from the created secure content, respectively, and are set in corresponding ones of the original-copy hashes 225 and the secure-content hashes 226, respectively. Note that, a blank value is set in a corresponding one of the administrator IDs 223.

Subsequently, the secure content creating means 11 transmits the thus created secure content to the secure content creation requesting means 31 (S504), and ends the processing.

Note that, as will be described later, whether or not content is permitted to be taken out can be determined with reference to a corresponding one of the secure content management records 220. Accordingly, a created secure content is not necessarily required to be stored in the storage device 2, and may be deleted after being transmitted to the secure content creation requesting means 31. The deletion is rather preferable for the purpose of information leakage prevention. A major purpose of storing the created secure content is to backup the secure content 39 in preparation for such a case where the operator of the client 3 mistakenly deletes the secure content 39.

<Effects of Secure Content Creation>

The following effects can be obtained by creating the secure contents 21 and managing the created secure contents 21 in the above described manner.

First of all, hash values of the created secure contents 21 are stored in the secure content hashes 226 of the respective secure content management records 220. For this reason, when the operator of the client 3 transmits the content 38 by attaching the content 38 to a mail, determination about whether or not the content 38 is a content from which any one of the secure contents 21 is created is made possible by: generating a hash value of the attached content 38; and determining whether or not the thus generated hash value coincides with any one of the secure content hashes 226. Then, transmission of the content 38 can be permitted only if the content 38 is a content from which the secure content 21 is created.

That is, contents permitted to be attached to mails are limited to those from which the secure contents 21 are created, and therefore, conversely, when attachment of any content to a mail is desired, creation of a corresponding one of the secure contents 21 is unavoidable. Then, when any one of the secure contents 21 is created, an operator who requests the creation is set in a corresponding one of the user IDs 222 of the secure content management records 220. Accordingly, in a case where any one of the secure contents 21 is created from a content that must not be attached to a mail, a history of such creation is maintained. For this reason, an action of creating one of the secure contents 21 from a content that must not be attached to a mail is prevented, whereby taking out of contents to the outside can be effectively restricted.

Additionally, determination about whether or not a content is one from which any one of the secure contents 21 is created is made by comparing a hash value of the content (which is, in other words, a matter of the content) to the hash values of the secure contents 21. Therefore, for example, in a case where a name of content is changed after a corresponding one of the secure contents 21 is created, there is no need to create another one of the secure contents 21 again.

On the other hand, in a case where a matter of a content is changed after a corresponding one of the secure contents 21 is created (for example, a case where confidential information, which is not contained in the content originally, is added to the content), a hash value of the content changes, whereby transmission of the content through attachment thereof to a mail can be prevented even if the content has the same content name.

For example, determination about whether or not taking-out of a content attached to a mail is permitted is made possible also by storing contents themselves in the storage device 2 of the content approving server 1 and comparing the attached content with the stored contents, the contents being permitted to be attached to mails. However, when this method is employed, a storage device capacity large enough to store the contents, attachment of which to mails is permitted, is required, and furthermore, comparison of the content to the stored contents requires a longer time. Moreover, since the contents, attachment of which to mails is permitted, are collectively stored, another risk of information leakage, which is information leakage from the storage device 2 of the content approving server 1, arises.

On the other hand, when the method according to the present invention is employed, it is needed only to store hash values (that is, data requiring a small capacity) of original contents and secure contents in the storage device 2 of the content approving server 1. Accordingly, determination as to whether or not taking-out of a content attached to a mail is permitted requires a short processing time, and furthermore, information leakage from the storage device 2 of the content approving server 1 can be prevented by using, as the hash values, parts of the secure contents or irreversible values generated by a so-called hash function.

Next, since the secure content management records 220 are prepared with respect to contents based on which the secure contents 21 are created, it is made possible to easily grasp contents (the secure contents) which are obtained by subjecting contents to an approach such as encryption, and thereby are made difficult to browse, look and listen, and the like.

For example, by providing the content approving server 1 with a display device, and a program that displays a list of the secure content management records 220, it is made possible to display, in a list, the content names 224, the creation dates and times 221, the user IDs 222 and the like of secure contents stored in the secure contents 21. Accordingly, an operator of the content approving server 1 can check the above displayed list, and thereby check which contents in the list are those likely to be transmitted by mail.

Additionally, as will be described later, by permitting attachment of contents in mail transmission only if corresponding ones of the valid/invalid flags 227 are valid, and additionally by providing the content approving server 1 with a program capable of updating the secure content management records 220, attachment to a mail and transmission of a content prohibited from being transmitted by mail can be prevented in a case where the above displayed list contains the content. Specifically, the prevention can be made possible by a change, from valid to invalid, of a corresponding one of the valid/invalid flags 227. Otherwise, any one of the user IDs 222, which is used for frequently creating the secure contents 21 with respect to contents prohibited from being transmitted, can be detected and warned.

Furthermore, every time one of the secure content management records 220 is created, an attention of an administrator can be called by transmitting, to a predetermined administrator by mail, matters set in the created one of the secure content management records 220.

<Alternative Method for Secure Content Creation>

As described above, various effects can be achieved by creating the secure contents 21 and managing the created secure contents 21 by use of the secure content management records 220. In the above described method, however, functions of the content approving system allow any operator, who can login to the secure content creating means 11, to create the secure contents 21 with respect to the contents 38 of any form. For example, an act of an operator cannot be prevented, the operator not minding if an administrator comes to know that the operator has created one of the secure contents 21 with respect to a content prohibited from being attached to a mail. Additionally, an act cannot be prevented where one of the secure contents 21 is created due to human error with respect to a content prohibited from being attached to a mail.

Accordingly, a content prohibited from being transmitted can be transmitted if an operator of the content approving system 1 overlooks an incidence where such one of the secure contents 21 is created.

In response, by subjecting operational actions, which are taken in creating each of the secure contents 21, to so-called workflow formation, creation of the secure contents 21 may be permitted only for contents approved by a predetermined administrator.

Note that, in the following description, a "workflow" means performing transmission and reception of, and a decision process on digitized application forms and notifications in accordance with a predetermined work procedure (a decision route).

Figure 6:
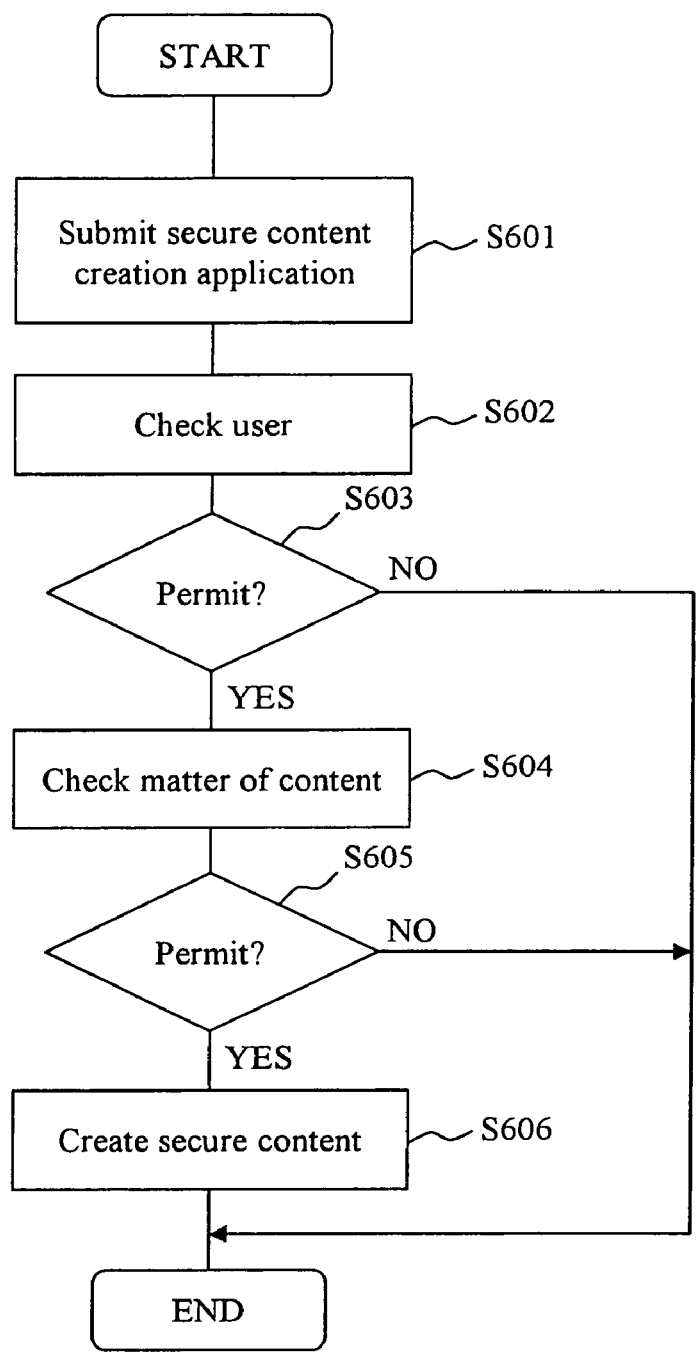
FIG. 6 is a flowchart describing operational actions taken in creating a secure content by using a workflow in the first embodiment.

FIG. 6 is a flowchart describing operational actions taken in creating the secure contents 21 by using the workflow.

Note that, in a case where the user creates the secure content 21 by using the workflow, the secure content creating means 11 may include a workflow function, or alternatively, a workflow server may be provided apart from the apparatuses shown in FIG. 1 (hereinafter, in description relating to FIG. 6, the secure content creating means 11 including the workflow function, or the workflow server, will be referred to as a "workflow product").

First of all, an operator (hereinafter, referred to as a "user" in the description relating to FIG. 6) of the client 3, who attempts to create a secure content, logins to the workflow product and then, while specifying any one of the contents 38, submits an application for secure content creation (S601).

After the secure content creation application is submitted, a notification about the submission of the secure content creation application is provided by the workflow product to the client 3 operated by a predetermined administrator (hereinafter, referred to as "system administrator" in description relating to FIG. 6).

By checking whether or not a user ID of the user exists in a previously prepared list of users permitted to create secure contents, the system administrator judges whether or not the system administrator is allowed to approve the secure content creation application submitted by the user (S602), the user ID being displayed on the display device 36 by the workflow product.

If the system administrator judges that the system administrator is not allowed to approve the secure content creation application submitted by the user, the system administrator instructs the workflow product to reject the application (in the case of NO in S603). The secure content creation application is ended by this instruction on the rejection.

If the system administrator judges that the system administrator is allowed to approve the secure content creation application submitted by the user (in the case of YES in S603), the system administrator displays on the display device 36 a matter of the content for which the application is submitted, and then judges whether or not the content is one that the system administrator is allowed to permit the user to attach to a mail and transmit (S604).

If the system administrator judges, for example, since the content is one relating to a business secret, that the system administrator is not allowed to permit the user to do so, the system administrator instructs the workflow product to reject the application (in the case of NO in S605). The secure content creation application is ended by this instruction on the rejection.

If the system administrator judges that the system administrator is allowed to permit the user to do so (in the case of YES in S605), the system administrator instructs the secure content creating means 11 to produce a secure content (S606).

Specifically, for example, the system administrator instructs the workflow product to start up the secure content creating means 11 and create the secure content. Then, the workflow product starts up the secure content creating means 11 and notifies the secure content creating means 11 of: a user ID of the user who submits the secure content creation application; a user ID of the system administrator; the content for which the secure content creation application is submitted; and a content name thereof.

Although operations performed by the secure content creating means 11 are substantially the same as those described in connection with FIG. 5, a difference is that a user ID of the system administrator, of which the workflow product notifies the secure content creating means 11 in S503, is set as an administrator ID 223 in a corresponding one of the secure content management records 220.

<Effects of Secure Content Creation According to Alternative Method>

According to the above described method employing the workflow, the secure contents 21 can be created without providing the client 3 with a particular program such as the secure content creation requesting means 31, and by using a generally available workflow product.

Additionally, since the secure contents 21 are created only for contents from the contents 38 that are permitted by a predetermined administrator, creation of the secure contents 21 with respect to contents not permitted to be attached to mails, that is, transmission of contents not permitted to be transmitted, can be more effectively prevented.

However, an operational load increases since this method necessitates processes such as checking by the predetermined administrator. Accordingly, which method to be employed for creating a secure content should be determined in consideration of: a risk at which contents not permitted to be transmitted are transmitted; and an operational load.

Note that, there exist workflow products having functions different from one product to another. The above described method employing the workflow is only an example, and appropriate ones of the operational actions taken in creating each of the secure contents 21 may be selected in accordance with functions of a workflow product to be used.

<Summary of Secure Content Creation>

Furthermore, the secure contents 21 can be created not only by use of a workflow product but also by any one of other alternative methods. What is essentially important is: that, with respect to contents permitted to be attached to mails, or, more generally speaking, with respect to contents permitted to be taken out to the outside, data generated based on parts or entireties of matters of the respective contents permitted to be taken out to the outside is stored after being generated; and that the data can be therefore used as data by use of which, even after a content name of any one of these contents is changed, the one content can be identified as a content permitted to be taken out to the outside.

<Operations Performed for Mail Transmission>

Figure 7:
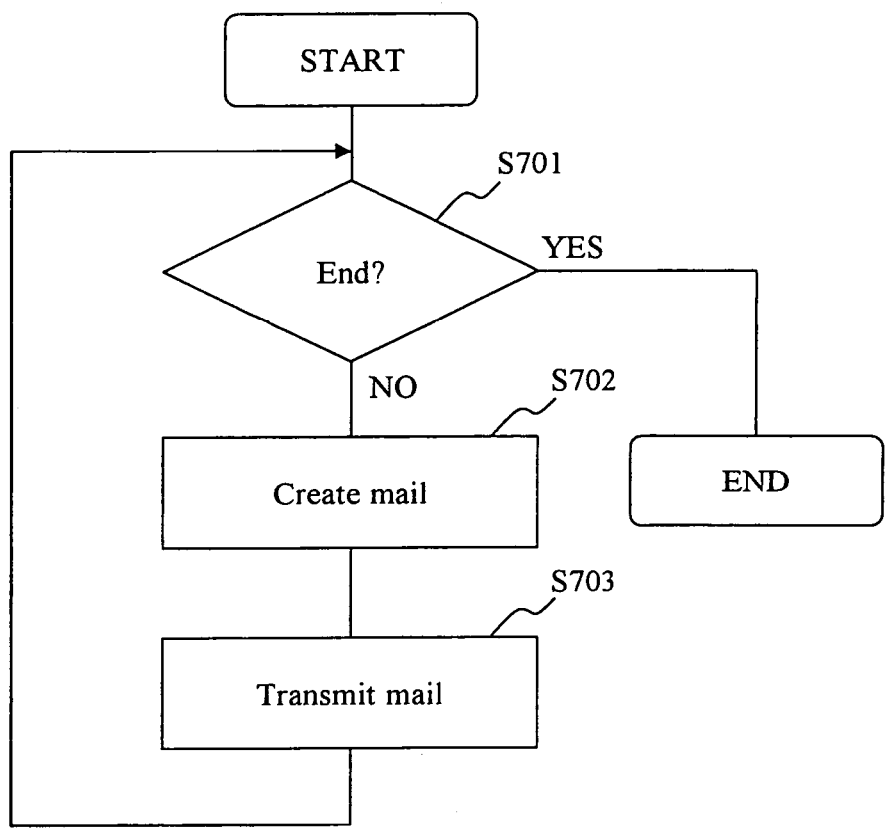
FIG. 7 is a flowchart showing operations performed in relation to mail transmission by a mail transmitting/receiving means in the first embodiment.

FIG. 7 is a flowchart showing operations performed for mail transmission by the mail transmitting/receiving means 32.

An operator of the client 3 starts up the mail transmitting/receiving means 32 by operating the input device 35.

After starting processing, the mail transmitting/receiving means 32 performs the following processing until being instructed by the operator of the client 3 to end the processing (S701).

The mail transmitting/receiving means 32 creates a mail (S702). Specifically, the mail transmitting/receiving means 32: displays a mail creation screen on the display device 36; sets, as the mail header 301 and the text body 302 that are shown in FIG. 3, a mail transmission destination, a mail text body and the like which are inputted by the operator of the client 3; and sets, as the attached content 303, one of the secure contents 39 that is specified by the operator of the client 3.

Note that, although the mail transmitting/receiving means 32 can also set, as the attached content 303, one of the contents 38 that has no processing such as encryption performed thereon, mail transmission is stopped in that case because, as will be described later, the filtering means 41 determines that the content 38 is a content not permitted to be transmitted.

Subsequently, the mail transmitting/receiving means 32 transmits the created mail to the filtering means 41 (S703).

Figure 8:
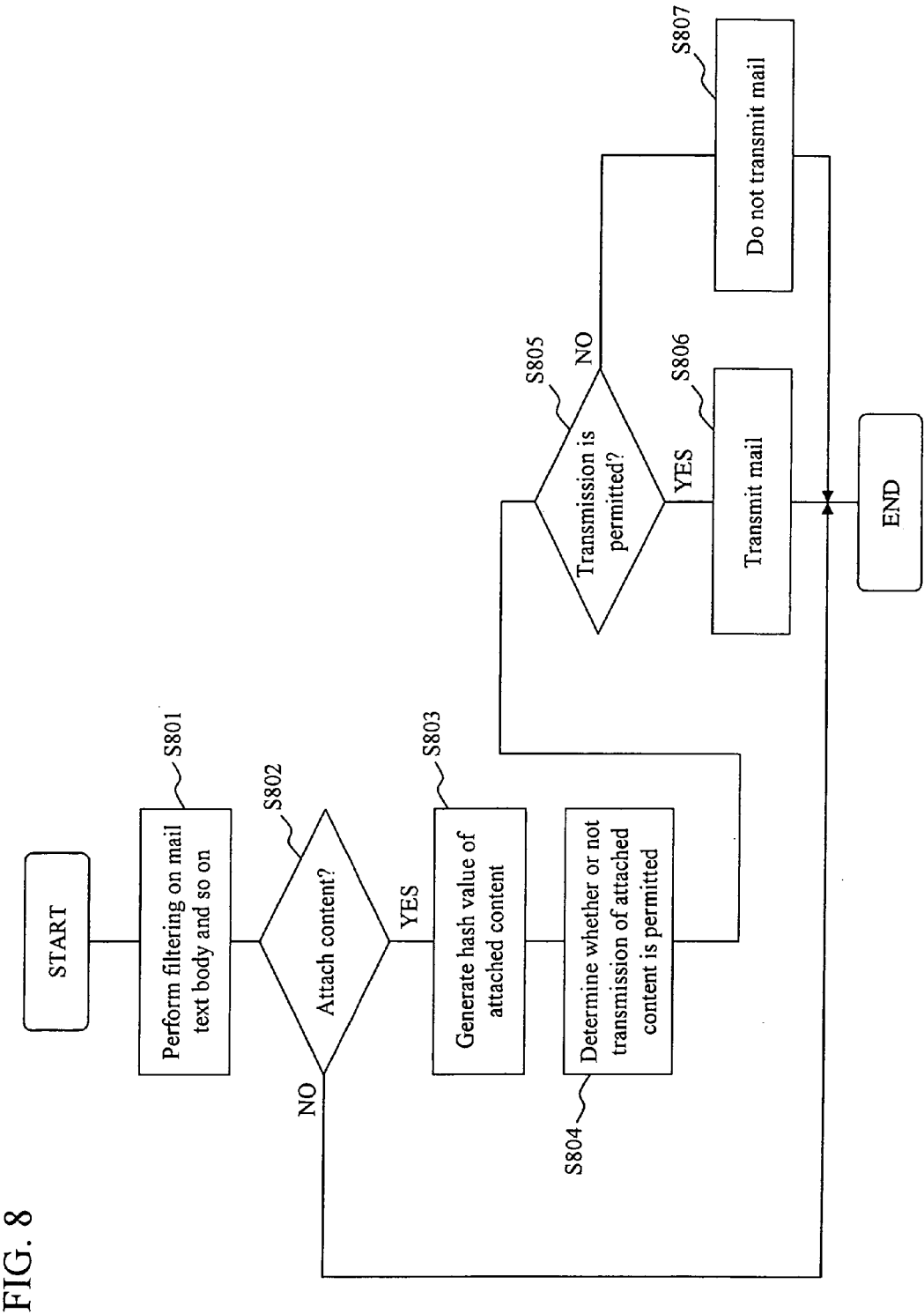
FIG. 8 is a flowchart showing operations performed by a filtering means in the first embodiment.

FIG. 8 is a flowchart showing operations performed by the filtering means 41.

The filtering means 41 is started up when the filtering server 4 receives a mail from the mail transmitting/receiving means 32.

After starting processing, the filtering means 41 makes a determination about whether or not any inappropriate word is contained in the mail text body 302 or the like of the mail transmitted by the mail transmitting/receiving means 32, or like (S801). This processing corresponds to so-called mail-filtering processing, and various methods are known for the processing. Therefore, no further description will be given thereof.

Subsequently, the filtering means 41 determines whether or not the attached content 303 is included in the mail (S802), and ends the processing if the attached content 303 is not included in the mail (in the case of NO in S802). The filtering means 41 performs the following processing if the attached content 303 is included in the mail (in the case of YES in S802).

The filtering means 41 generates a hash value of the attached content 303 (S803).

Here, as described above, it is necessary that a method for the hash value generation be matched with a method taken by the secure content creating means 11 for generating hash values of the secure contents 21. That is, although it is not necessary that the secure content creating means 11 and the filtering means 41 follow the same processing procedure, it is necessary that these means generate the same hash value for each content. Additionally, in a case where the plural attached contents 303 are included in a mail, the filtering means 41 generates hash values respectively for all of the attached contents 303.

The filtering means 41 determines whether or not transmission of the attached content 303 is permitted (S804). Specifically, the filtering means 41 transmits, to the content taking-out approving means 12, the hash value generated with respect to the attached content 303, and thereby makes an inquiry about whether or not transmission of the attached content 303 is permitted. If the content taking-out approving means 12 responds that the transmission is permitted (that is, taking-out thereof is permitted), the filtering means 41 determines that transmission of the attached content 303 is permitted. Whereas, if the content taking-out approving means 12 responds that the transmission is not permitted (that is, the taking-out is not permitted), the filtering means 41 determines that transmission of the attached content 303 is not permitted. Note that, in a case where the plural attached contents 303 are included in a mail, the filtering means 41 makes inquiries about whether or not the respective attached contents 303 are permitted.

If the filtering means 41 determines that transmission of the attached content 303 is permitted (in the case of YES in S805), the filtering means 41 transmits the mail to the mail server 5 (S806). If the filtering means 41 determines that transmission of the attached content 303 is not permitted (in the case of NO in S805), the filtering means 41 ends the processing without transmitting the mail (S807).

Note that, the filtering means 41 may be configured to, in a case where the plural attached contents 303 are included in a mail, prohibit transmission of the mail if at least any one of the attached contents 303 is not permitted to be transmitted. Attachment of any content not permitted to be transmitted indicates a possibility that an inappropriate word or the like that cannot be detected by the filtering means 41 exists also, for example, in the mail text body 302. Accordingly, transmission of inappropriate mails can be more effectively prevented by thus configuring the filtering means 41 than by a later described method.

On the other hand, a possibility of inconvenience occurring in business arises if mail transmission is stopped even in a case where, with the plural contents attached to a mail, only one of the attached contents 303 is not permitted to be transmitted. Accordingly, in a case where, with plural ones of the attached contents 303 being included in a mail, at least one but not all of these plural attached contents 303 is not permitted to be transmitted, the filtering means 41 may be configured not to stop mail transmission, but to transmit the mail after deleting any one of the attached contents 303 that is not permitted to be transmitted.

Furthermore, also in a case where, with only one of the attached contents 303 being included in a mail, this one attached content 303 is not permitted to be transmitted, the filtering means 41 may be configured not to stop mail transmission, but to transmit the mail after deleting the one attached content 303. If the filtering means 41 is thus configured, an effect of preventing transmission of inappropriate mails is reduced to some extent but a possibility of inconvenience occurring in business can be reduced together.

Note that, when stopping mail transmission, or when transmitting a mail after deleting any one of the attached contents 303 that is not permitted to be transmitted, the filtering means 41 may be configured to transmit a mail notifying the sender of the mail, a predetermined system administrator or the like that transmission of an inappropriate content is attempted.

Figure 9:
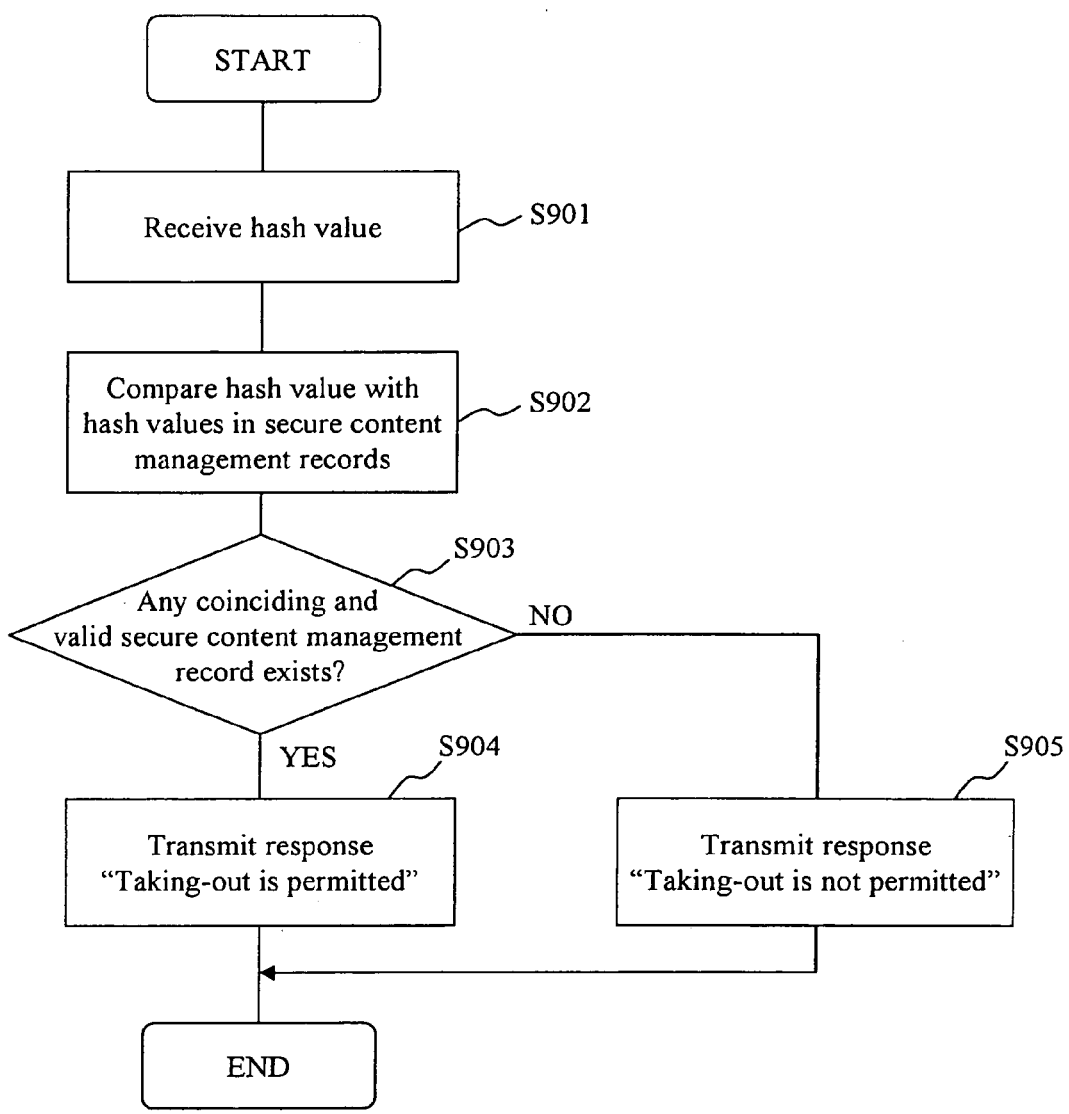
FIG. 9 is a flowchart showing operations performed by a content taking-out approving means in the first embodiment.

FIG. 9 is a flowchart showing operations performed by the content taking-out approving means 12.

The content taking-out approving means 12 is started up when the content approving server 1 receives from the filtering means 41 an inquiry about whether or not transmission of the attached content 303 is permitted.

After starting processing, the content taking-out approving means 12 receives the hash value transmitted by the filtering means 41 (S901), and compares this hash value with each of hash values in the secure content management records 220 (S902). Specifically, the content taking-out approving means 12 determines whether or not the same value as the received hash value is set in any one of the secure content hashes 226 of the respective secure content management records 220.

If there is any one of the secure content management records 220 that satisfies the above condition and has "valid" set in a corresponding one of the valid/invalid flags 227 (in the case of YES in S903), the content taking-out approving means 12 transmits a response "taking-out is permitted" to the filtering means 41 (S904). If there is not such one of the secure content management records 220 (in the case of NO in S903), the content taking-out approving means 12 transmits a response "taking-out is not permitted" to the filtering means 41 (S905), and ends the processing.

Note that, the content taking-out approving means 12 may be configured to refer not only to the secure content hashes 226 but also to the original-copy hashes 225.

Specifically, for example, the filtering means 41 transmits the attached content 303 to the content taking-out approving means 12 in S803 and S804 in FIG. 8 instead of generating a hash value of the attached content 303. Then, in step S901, the content taking-out approving means 12 receives the attached content 303 instead of the hash value, and then generates a hash value from the attached content 303. Then, in step S902, if a hash value coinciding with the thus generated hash value cannot be found in any one of the secure content management records 220, the content taking-out approving means 12 generates a hash value after performing on the attached content 303 the same processing, such as encryption, as the processing performed by the secure content creating means 11, and then, determines whether or not a hash value coinciding with the thus generated hash value can be found in any one of the secure content management records 220.

By thus configuring the content taking-out approving means 12, even in a case where an original content (a content before being subjected to the processing such as encryption), from which one of the secure contents 21 is created, is attached to a mail, transmission of the content can be permitted.

Note that, the above configuration requires: that, in S904, the content taking-out approving means 12 should transmit to the filtering means 41 a secure content in addition to the response "taking out is permitted", the secure content being obtained by subjecting the attached content 303 to the processing such as encryption; and that the filtering means 41 should replace the attached content 303 with the secure content received from the content taking-out approving means 12.

<Application to Content Taking-Out Control in General>

Although the method for preventing transmission of inappropriate contents in cases where contents are attached to mails has been described in the first embodiment, applicable areas of the present invention are not limited to mail transmission, and the present invention is applicable also to, for example, cases where contents are copied onto portable media (removable media).

Figure 10:
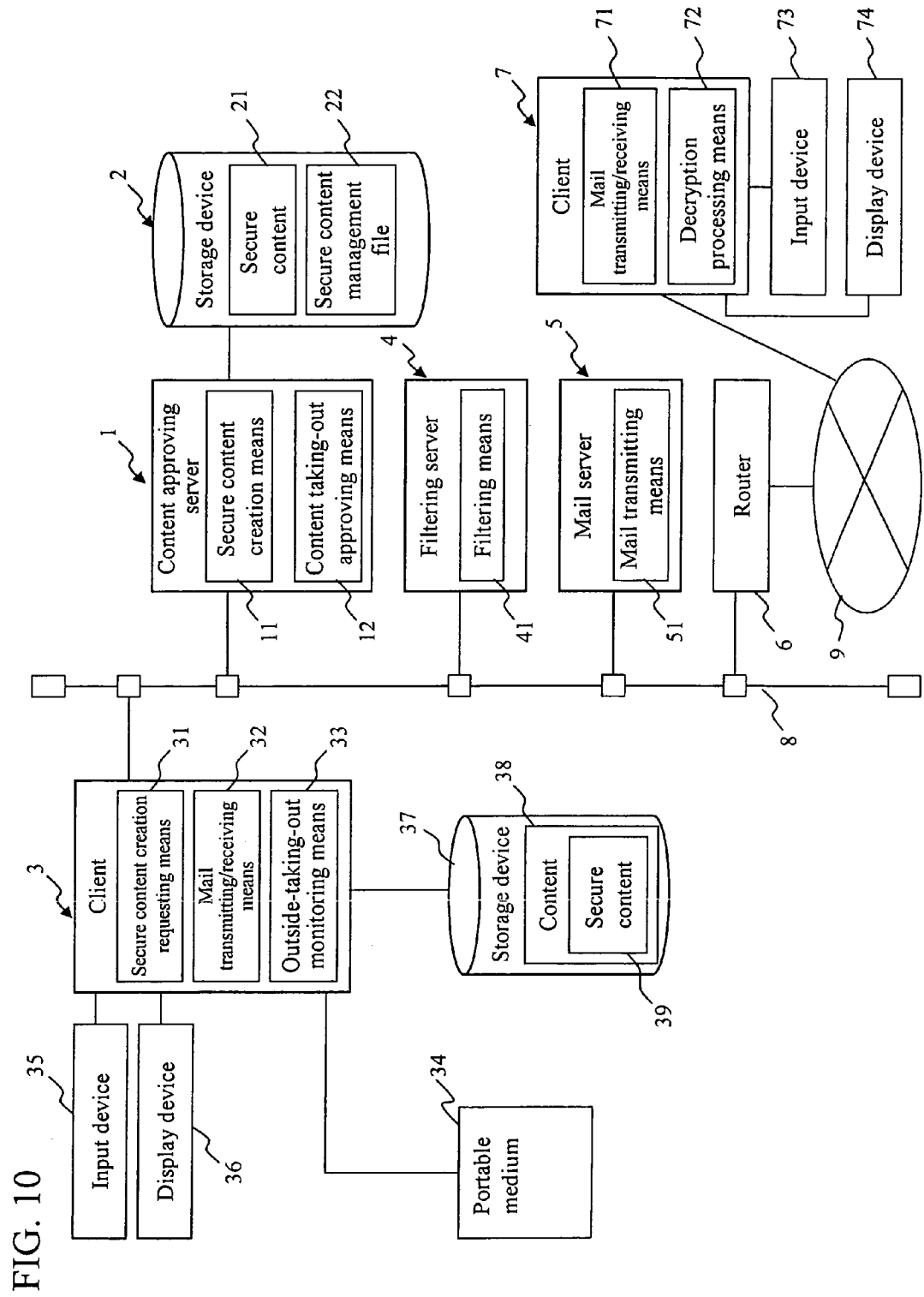
FIG. 10 is a system configuration diagram of a content approving system in a second embodiment according to the present invention.

FIG. 10 is a system configuration diagram of a content approving system in a second embodiment according to the present invention.

Differences from the first embodiment are: that the client 3 is communicably connected to a portable medium 34 in addition to the input device 35 and the like; and that the system is provided with an outside-taking-out monitoring means 33 (an outside-taking-out monitoring program) in addition to the secure content creation requesting means 31 and the like.

The portable medium 34 is, for example, a medium such as a USB memory or a DVD, and an operator of the client 3 can copy the contents 38, which are stored in the storage device 37, onto the portable media 34 by operating the input device 35.

When copying of any one of the contents 38 onto the portable medium 34 is attempted, the outside-taking-out monitoring means 33 determines whether or not the copying is permitted, and then, stops copying processing if the copying is not permitted.

Figure 11:
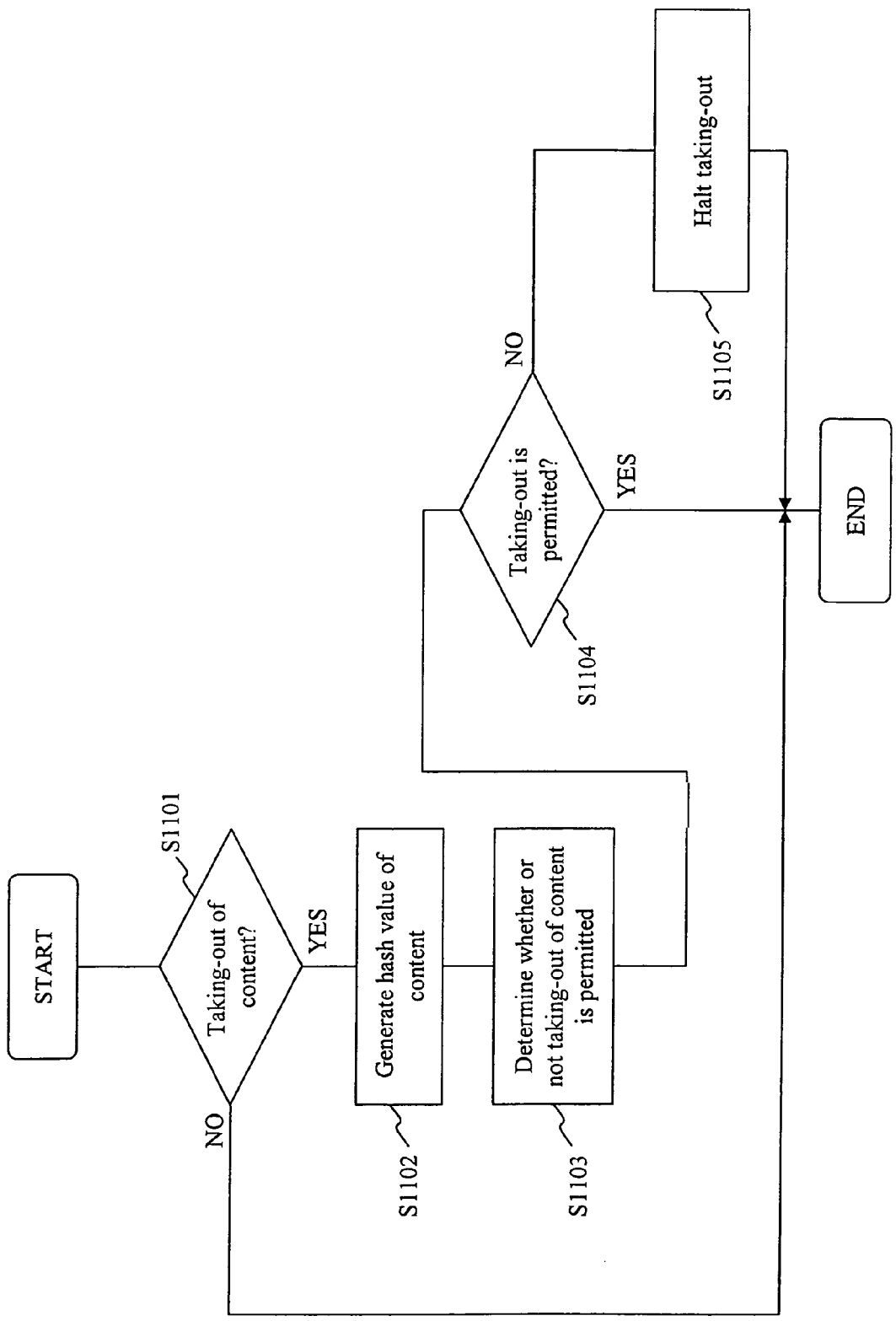
FIG. 11 is a flowchart showing operations performed by an outside-taking-out monitoring means in the second embodiment.

FIG. 11 is a flowchart showing operations performed by the outside-taking-out monitoring means 33.

Although not being illustrated, an OS (Operating System) of the client 3 starts up the outside-taking-out monitoring means 33 upon detecting an attempt to copy any one of the contents 38. Note that, such processing can be made possible by functions with which an ordinary OS is provided.

After starting processing, the outside-taking-out monitoring means 33 determines whether or not there is an attempt to take out the content 38 to the outside (whether or not "content taking-out" is attempted) (S1101). Specifically, if a copy destination of the content 38 is the portable medium 34, the outside-taking-out monitoring means 33 determines that there is an attempt to take out the content 38 to the outside.

If it is determined that "content taking-out" is not attempted (in the case of NO in S1101), the outside-taking-out monitoring means 33 ends the processing, and the copying processing is continued as a result. On the other hand, if it is determined that "content taking-out" is attempted (in the case of YES in S1101), the outside-taking-out monitoring means 33 performs the following processing.

The outside-taking-out monitoring means 33 generates a hash value of the content 38 that the operator attempts to take out (S1102). Here, a method for the hash value generation has to be matched with a method used by the secure content creating means 11 for generating a hash value. That is, although it is not necessary that the secure content creating means 11 and the outside-taking-out monitoring means 33 follow the same processing procedure, it is necessary that these means generate the same hash value for each content.

The outside-taking-out monitoring means 33 determines whether or not taking-out of the content 38 is permitted (S1103). Specifically, the outside-taking-out monitoring means 33 transmits the hash value, which is generated with respect to the content 38 that the operator attempts to take out, to the content taking-out approving means 12, thereby making an inquiry about whether or not taking-out of the content 38 is permitted. If the content taking-out approving means 12 responds that the taking-out is permitted, the outside-taking-out monitoring means 33 determines that taking-out of the content 38, which the operator attempts to take out, is permitted. Whereas, if the content taking-out approving means 12 responds that the taking-out is not permitted, the outside-taking-out monitoring means 33 determines that the taking-out is not permitted.

If the outside-taking-out monitoring means 33 determines that taking-out of the content 38, which the operator attempts to take out, is permitted (in the case of YES in S1104), the outside-taking-out monitoring means 33 ends the processing, and the copying processing is continued as a result. On the other hand, if the outside-taking-out monitoring means 33 determines that taking-out of the content 38, which the operator attempts to take out, is not permitted (in the case of NO in S1104), the outside-taking-out monitoring means 33 halts the taking-out attempted through copying of the content 38 onto the portable medium 34 (S1105), and ends the processing.

Note that, also in cases of copying contents onto the portable medium 34, when there is an attempt to take out an original content (a content before being subjected to the processing such as encryption) from which one of the secure contents 21 is created, a secure content can be created from the content that the operator attempts to take out, and the created secure content can be copied.

As described above, whether or not taking-out of each content to the removable medium 34 is permitted can be controlled by having the outside-taking-out monitoring means 33 detect an attempt to copy the content. For example, in a case where one-by-one copying, onto a USB memory, of files stored in a hard disk of a PC is operated with the USB memory being attached to the PC, whether or not taking-out of a file is permitted can be controlled every time the copying is attempted. Accordingly, a user who operates the copying can know whether or not taking-out of each of the files, which the user attempts to take out, is permitted.

However, the abovementioned example case includes a case where the user operates copying of plural ones of the files together onto the USB memory. In this case, if a file not permitted to be taken out is included among these files, copying of which the user operates, the outside-taking-out monitoring means 33 should perform any one of the following operations:

(1) halting the copying of all of these files including the file not permitted to be taken out; and (2) causing the copying to keep operated only with respect to files permitted to be taken out.

Here, when either of the abovementioned operations is performed, it is necessary, in order for the user to gain approval for taking-out, that the user should be informed of which file is one not permitted to be taken out. In addition, it is preferable that the user be informed as early as possible of whether or not each of the files which the user attempts to take out is permitted.

Described below are operations performed by the outside-taking-out monitoring means 33 in the case where the outside-taking-out monitoring means 33 displays to the user, with respect to each content, whether or not contents are permitted to be taken out.

Figure 12:
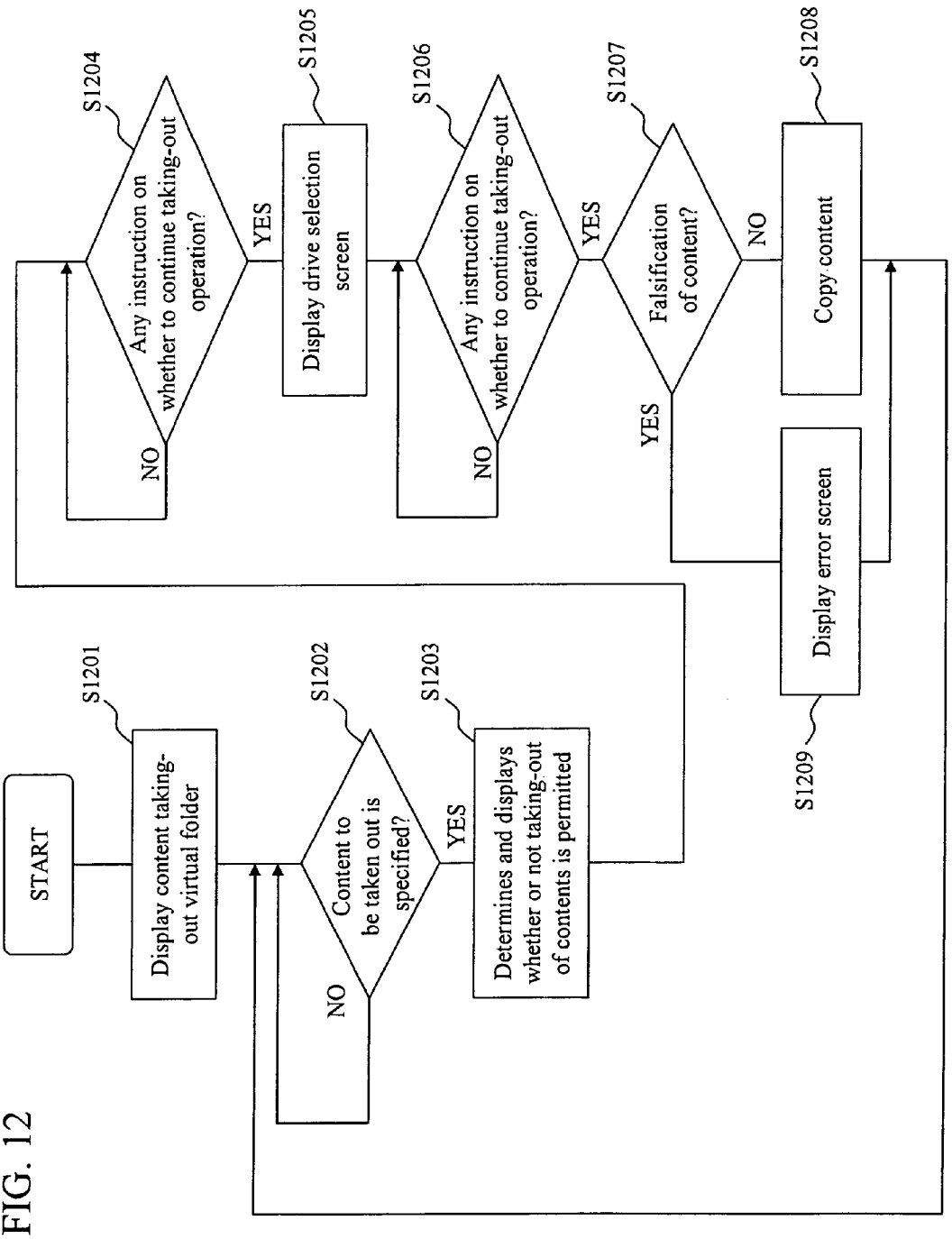
FIG. 12 is a flowchart showing other operations performed by the outside-taking-out monitoring means in the second embodiment.

FIG. 12 is a flowchart showing operations performed by the outside-taking-out monitoring means 33 in this case.

The outside-taking-out monitoring means 33 is started up at the startup of the client 3, and displays a content taking-out virtual folder on the display device 36 (S1201).

Figure 13:
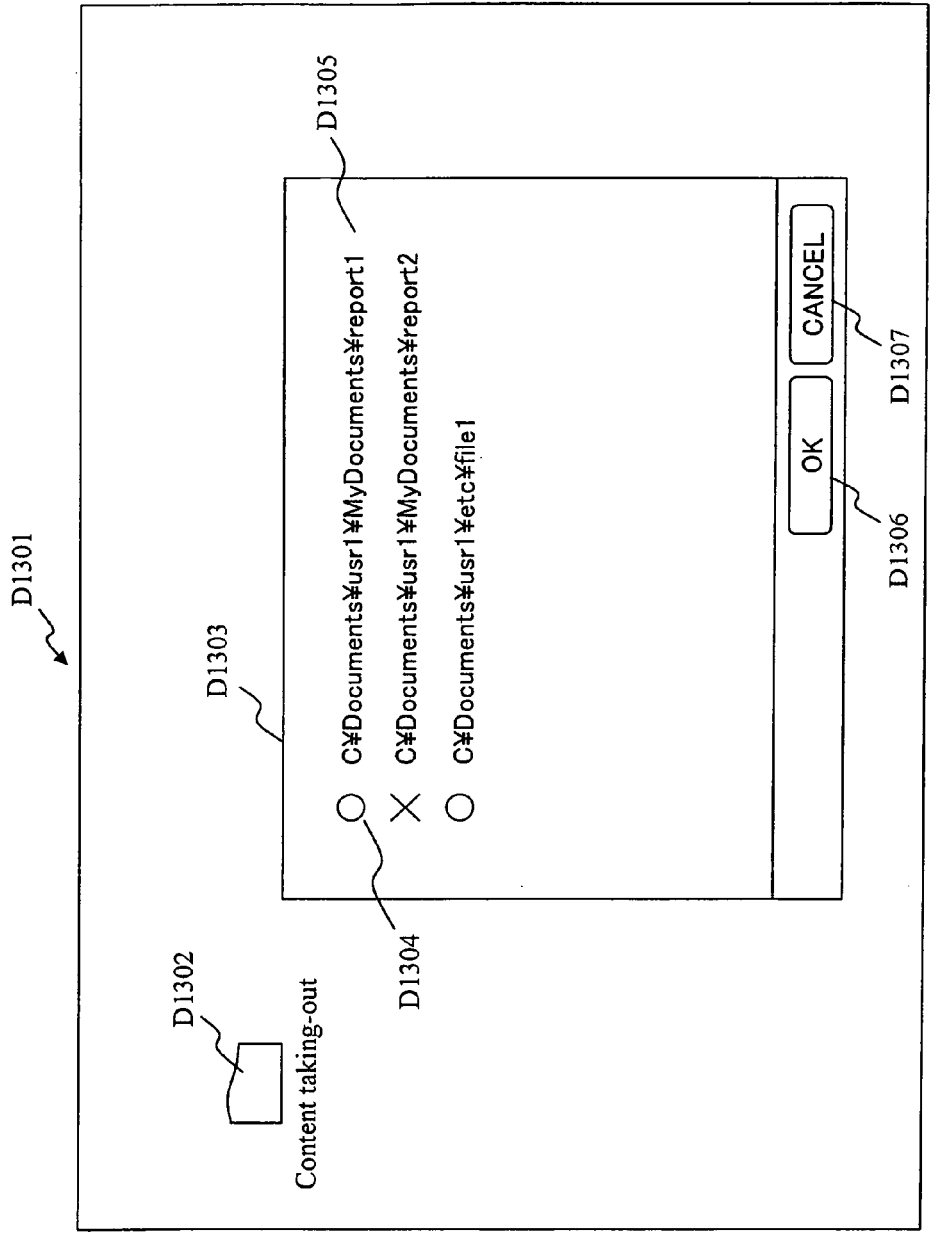
FIG. 13 is an example of a taking-out content confirmation screen in the second embodiment, the screen image being displayed by the outside-taking-out monitoring means.

The content taking-out virtual folder is displayed on a so-called desktop (D1301) on the display device 36 as if being a folder, for example, as shown by D1302 in FIG. 13. The content taking-out virtual folder is not actually stored in the storage device 37, and is a virtual folder displayed so that the user can operate copying of contents through mouse-dragging operation or the like.

Note that, although FIG. 13 shows an example where the content taking-out virtual folder is displayed on the desktop (D1301), the content taking-out virtual folder may be displayed in a tree view of folders, for example, when a logical drive (not illustrated in the drawings) displayed on the desktop (D1301) is double-clicked, the folders being contained in the logical drive.

The outside-taking-out monitoring means 33 waits until the user specifies any content to be taken out (in the case of NO in S1202). For example, if the user selects one or more of the contents 38 by operating a mouse (the input device 35), and then drags the selected contents 38 onto the content taking-out virtual folder, the outside-taking-out monitoring means 33 determines that the user specifies any content to be taken out.

If the outside-taking-out monitoring means 33 determines that the user specifies any content to be taken out (in the case of YES in S1202), the outside-taking-out monitoring means 33 determines whether or not taking-out of each of the contents 38 is permitted, and then, displays a taking-out content confirmation screen (S1203).

The method for determining whether or not taking-out of each of the contents 38 is permitted is the same as the one described in FIG. 11. The determination about whether or not taking-out is permitted is performed for all of the contents specified as the contents to be taken out (for example, all of the contents dragged onto content taking-out virtual folder).

FIG. 13 shows an example (D1303) of the taking-out content confirmation screen displayed by the outside-taking-out monitoring means 33 at this time.

On the taking-out content confirmation screen (D1303), names (D1305) of contents specified as the contents to be taken out are displayed in the absolute path form, and whether or not taking-out of these respective contents are permitted are displayed by use of marks (D1304) each of which is a circle (taking-out permitted) or a cross mark (taking-out prohibited).

With these being displayed, the user can know, in one glance, whether taking-out of each content that the user attempts to take out is permitted or prohibited. Furthermore, by operating the screen such as clicking with the mouse on parts corresponding to the names (D1305) of the displayed contents, the user can specify, as one or ones to be taken out, one or more of contents displayed as being permitted to be taking-out.

Additionally, "OK" (D1306) and "Cancel" (D1307) buttons are displayed on the taking-out content confirmation screen, whereby the user can choose, by clicking one of these buttons, whether to continue or stop the taking-out operation.

The outside-taking-out monitoring means 33 waits until any one of the "OK" and "Cancel" buttons on the taking-out content confirmation screen is clicked (in the case of NO in S1204). Then, although not being illustrated in the drawings, clicking of the "Cancel" button (D1307) leads to a determination that an instruction is given to stop the taking-out operation, whereby the outside-taking-out monitoring means 33 closes the taking-out content confirmation screen (deletes the screen from the desktop (D1301)), and then waits again until the user specifies any content to be taken out (S1202).

On the other hand, clicking of the "OK" button (D1306) leads to a determination that an instruction is given to continue the taking-out operation, whereby the outside-taking-out monitoring means 33 displays a drive selection screen on the desktop (D1301) (S1205). Note that, in the following processing, a content selected as described above through operation such as clicking with the mouse on parts corresponding to the names (D1305) will be regarded as a content to be taken out.

Figure 14:
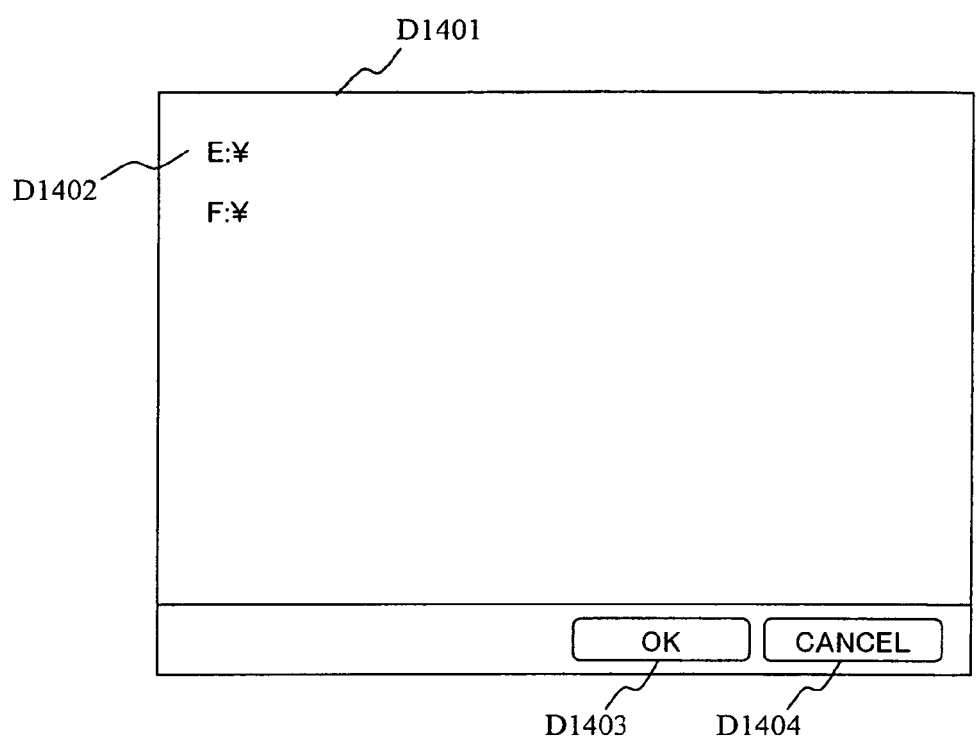
FIG. 14 is an example of a drive selection screen in the second embodiment, the screen image being displayed by the outside-taking-out monitoring means.

FIG. 14 is an example of the drive selection screen (D1401) displayed by the outside-taking-out monitoring means 33.

On the drive selection screen (D1401), a list (D1402) of names of logical drives assigned to portable media is displayed, the logical drives being among logical drives that the client 3 can access.

By clicking with the mouse one of parts corresponding to the thus displayed logical drives, the user can specify a portable medium onto which the content to be taken out should be copied.

Additionally, "OK" (D1403) and "Cancel" (D1404) buttons are displayed on the drive selection screen, whereby the user can specify, by clicking one of these buttons, whether to continue or stop the taking-out operation.

The outside-taking-out monitoring means 33 waits until any one of the "OK" and "Cancel" buttons on the drive selection screen is clicked (in the case of NO in S1206). Then, although not being illustrated in the drawings, clicking of the "Cancel" button (D1404) leads to a determination that an instruction is given to make another selection of a content to be taken out, whereby the outside-taking-out monitoring means 33 closes the drive selection screen (deletes the screen from the desktop (D1301)), and then waits again until any one of the "OK" and "Cancel" buttons on the taking-out content confirmation screen is clicked (S1204).

On the other hand, clicking of the "OK" button (D1403) leads to a determination that an instruction is given to continue the taking-out operation, whereby the outside-taking-out monitoring means 33 performs the following processing (in the case of YES in S1206).

Subsequently, the outside-taking-out monitoring means 33 determines whether or not there is any falsification made in a matter of each content to be taken out (S1207). This is because, it is possible to make such falsification, for example, by creating a content that contains none of business secrets and the like, storing the content in the storage device 37, receiving permission to take out the content, dragging the content onto the content taking-out virtual folder, having the content displayed on the content confirmation screen as one permitted to take out, and thereafter adding a business secret or the like to the content. Accordingly, it is necessary that taking-out of the content having falsification thus made should be prevented after the content confirmation screen is displayed.

Specifically, the outside-taking-out monitoring means 33 has a hash value of each content stored therein, the hash value being calculated when a determination is made (S1203) about whether taking-out of the content is permitted. After the "OK" button on the drive selection screen is clicked, the outside-taking-out monitoring means 33 calculates again a hash value of a content to be taken out, and determines whether this hash value coincides with the previously stored hash value.

Then, if this hash value coincides therewith, it is determined that there is no falsification made in a matter of the content to be taken out (in the case of NO in S1207), and the outside-taking-out monitoring means 33 copies the taken-out content onto a portable medium corresponding to a selected one of the logical drives (S1208).

On the other hand, if this hash value does not coincide therewith, it is determined that there is falsification made in the matter of the content to be taken out (in the case of YES in S1207), and an error screen is displayed on the desktop (S1209).

Note that, the longer a time until the "OK" button on the drive selection screen is clicked after the content confirmation screen is displayed, the higher a risk of having the above described falsification made. Additionally, it is also conceivable that, with the passage of long time after the content confirmation screen is displayed, permission to take out the content is made invalid during that time.

In this respect, the outside-taking-out monitoring means 33 may be configured: to determine an elapsed time since the display of the content confirmation screen; and to, if the "OK" button on the drive selection screen is not clicked until after a predetermined time period (for example, 15 minutes) elapses, close the content confirmation screen and the drive selection screen and wait again until the user specifies any content to be taken out (S1202).

The cases where any one of the contents 38 is attached to a mail and transmitted and where any one of the contents 38 is copied onto a portable medium have been described above. However, for example, also in a case where any one of the contents 38 is uploaded to a Web server, it can be made possible to upload only contents permitted to be taken out.

Specifically, that is made possible, for example, by providing the client 3 with a file transferring means, and causing this file transferring means to determine, when the content 38 is uploaded to the Web server as in the case of when the content 38 is transmitted by mail, whether the taking out of the content 38 is permitted or prohibited.

Incidentally, in the processing of each of the above described cases, hash values are compared when sameness between contents (for example, the processing in S902 in FIG. 9) is determined. This is because it is impossible that two contents having different hash values are the same content, and because two contents having the same hash value can be considered in general as having the same matter. However, it is expected that, in the future, as a capacity of a storage device will increase further and further, the number of contents stored in a storage device will increase. Therefore, the possibility cannot be denied that the same hash value will be actually calculated with respect to contents having different matters.

In this respect, when sameness between contents is determined, not only a comparison between hash values but also a comparison between sizes (byte counts or the like) of the contents may be made. Specifically, if the sizes coincide with each other at the same time as the hash values coincide with each other, the contents may be determined as being the same, whereas, if the hash values or the sizes do not coincide with each other, the contents may be determined as being different from each other. In this manner, sameness between contents can be more correctly determined.

Incidentally, as has been described by use of FIG. 6, in each of the first and second embodiments, a workflow can be used when each of the secure contents 21 is created. Then, in the workflow described by use of FIG. 6, when the secure content creation application is submitted by an operator of the client 3 who attempts to create a secure content (S601 in FIG. 6), a notification about an incidence where the secure content creation application is submitted is provided by the workflow product to the client 3 operated by a predetermined administrator. However, a judgment about whether to approve or reject the secure content creation application is left to this administrator. For this reason, regardless of who are operators submitting secure content creation applications, and regardless of degrees of confidentiality of contents, this administrator has to judge, by checking applicants and matters of all of the contents, whether to approve or reject all of the secure content creation applications (S602 and S604 in FIG. 6), and has to instruct the workflow product to approve or reject all of the applications.

For this reason, a great burden is borne by an administrator who approves or rejects secure content creation applications. For example, in a department that makes important decisions and the like in a corporation and regularly handles highly confidential contents, reduction of a risk of information leakage is necessary no matter how great a burden borne by an administrator is. On the other hand, in a department where the number of highly confidential contents is not so large, it is necessary to contrive ways to reduce a burden borne by an administrator to a minimum.

One method that can be taken for that purpose is to change a part of the workflow described by use of FIG. 6 and configure the filtering server 4 to perform a part of judgment about whether to approve or reject the secure content creation application.

A third embodiment will be described below where the workflow described just above is employed.

Note that, the third embodiment is the same as each of the first and second embodiments except for configurations, functions and the like described below.

Figure 15:
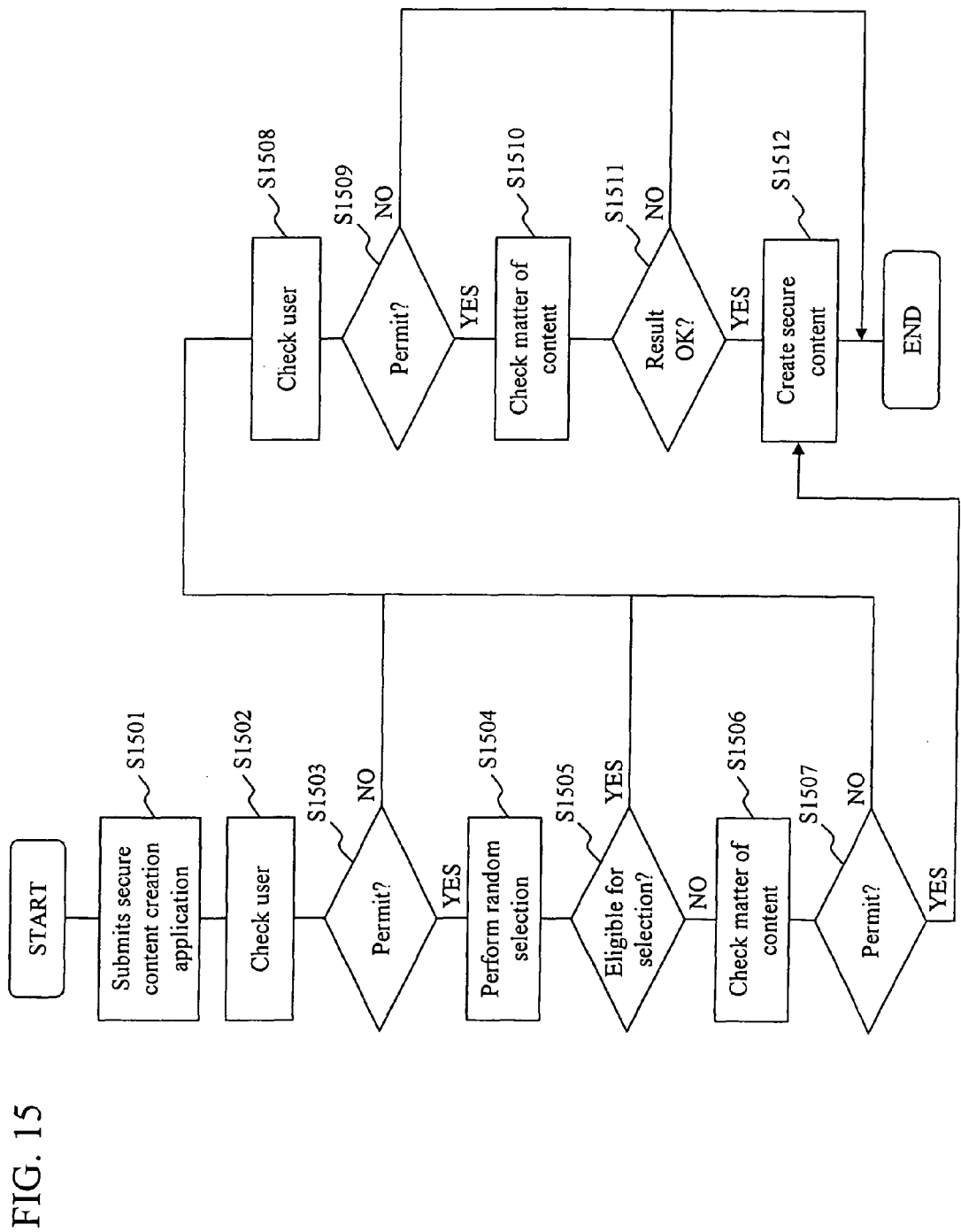
FIG. 15 is a flowchart describing operational actions taken, and the like in creating a secure content by using a workflow in a third embodiment.

FIG. 15 is a flowchart describing: operational actions taken in creating each of the secure contents 21 by using the workflow and using an automatic judgment function; and operations performed by the respective means.

In this workflow, an automatic judgment can be made by use of the filtering means 41 of the filtering server 4 when each of the secure contents 21 is created.

Note that, in a case where an automatic judgment on whether to create each of the secure contents 21 is made by use of the filtering means 41, the content approving server 1 may be provided with the filtering server 4.

First of all, an operator (hereinafter, referred to as "user" in description relating to FIG. 15) of the client 3 who attempts to create a secure content logins to the workflow product, and then, while specifying any one content of the contents 38, submits an application for creation of the secure content (S1501).

By checking whether the user exists in a previously prepared list of users permitted to create secure contents on the basis of automatic judgments, the workflow product judges whether or not approval of the secure content creation application submitted from the user is allowed (S1502).

Note that, although not being illustrated in the drawings, the list of users permitted to create secure contents on the basis of automatic judgments may be prepared, for example, in the following manner. While a file listing users permitted to create secure contents is stored in a storage device connected to a server on which the workflow products operates, there is provided in the file, with respect to each of the users, a flag indicating whether or not the user is permitted to create secure contents on the basis of automatic judgments.

In a case of a user not permitted to create secure contents on the basis of automatic judgments, the workflow product rejects the application in the automatic judgment (in the case of NO in S1503), and the client 3 operated by a predetermined administrator (hereinafter, referred to as "system administrator" in description relating to FIG. 15) is notified by the workflow product that the secure content creation application is submitted.

By checking whether or not a user ID of the user exists in a previously prepared list of users permitted to create secure contents, the system administrator judges whether or not the system administrator is allowed to approve the secure content creation application submitted by the user (S1508), the user ID being displayed on the display device 36 by the workflow product.

If the system administrator judges that the system administrator is not allowed to approve the secure content creation application submitted by the user, the system administrator instructs the workflow product to reject the application (in the case of NO in S1509). The secure content creation application is ended by this instruction on the rejection.

If the system administrator judges that the system administrator is allowed to approve the secure content creation application submitted by the user (in the case of YES in S1509), the system administrator displays on the display device 36 a matter of the content for which the application is submitted, and then judges whether or not the content is one that the system administrator is allowed to permit the user to attach to a mail and transmit (S1510).

If the system administrator judges, for example, since the content is one relating to a business secret, that the system administrator is not allowed to permit the user to do so, the system administrator instructs the workflow product to reject the application (in the case of NO in S1511). The secure content creation application is ended by this instruction on the rejection.

In a case of a user permitted to create secure contents on the basis of automatic judgments (in the case of YES in S1503), the workflow product randomly selects a workflow used for continuing secure content creation in the automatic judgment (S1504). A probability at which each of the users is randomly selected, and users to be selected, can be previously specified and can be also changed. Furthermore, the system is provided with, for example: a function of periodically including, in audited subjects, users temporarily set as those ineligible for the random selection, and, so as to prevent a mistake of not turning back the setting of users temporarily set as those ineligible for the random selection, automatically forcing each user to be set as one eligible for the random selection after the elapse of a specified time period; and an effective period by the end of which the probability is forced to change.

Note that, although the probability at which each of the users is randomly selected, a list of previously specified eligible users, and the effective period are not illustrated in the drawings, the system may be configured, for example, in the following manner. While a file, in which the list of previously specified eligible users, the probability at which each of the users is randomly selected, and the effective period are set, is stored in a storage device connected to a server on which the workflow products operates, there are provided in the file with respect to each of the users: a flag indicating whether or not the user is set eligible for the random selection; the probability at which the user is randomly selected; and the effective period.

If the user is found eligible for the selection (in the case of YES in S1505), the system administrator is notified of this, and the workflow moves on to the above described flow in which the system administrator checks the user (S1508).

If the user is found ineligible for the selection (in the case of NO in S1505), the content is analyzed by the filtering means 41 of the filtering server 4 (S1506).

If the filtering means 41 of the filtering server 4 determines that the content contains a matter relating, for example, a business secret (in the case of NO in S1507), the system administrator is notified of this, and the workflow moves on to the above described flow in which the system administrator checks the user (S1508).

If the content contains no elements that can be detected by the filtering means 41 of the filtering server 4 (in the case of YES in S1507), the workflow products instructs the secure content creating means 11 to create a secure content.

According to the secure content creation flow based on automatic judgment described above, a user previously permitted to create secure contents can create a secure content, without requiring judgment of the system administrator, as long as the content contains no elements that can be detected by the filtering means. Thereby, a wait time of the user can be shortened, and a burden borne by the system administrator can be reduced.

Furthermore, the secure content creation flow based on automatic judgment is randomly forced to be checked by the system administrator within the limitation set by a previously specified probability, whereby the system is expected to be effective in warning against users permitted to use the secure content creation flow based on automatic judgment, and in detecting a loophole in the filtering means of the filtering server 4.

CONCLUSION

When an operator of the client 3 attempts to take out some contents of the contents 38 to the outside by transmitting these contents 38 as attachments of an e-mail or by copying these contents 38 onto a portable medium, only contents whose secure contents 21 are created can be permitted to be taken out. That is, taking-out of contents to the outside can be effectively limited.

Additionally, referring to the secure content management records 220 makes it possible to easily know secure contents permitted to be taken out to the outside, and to prohibit certain content from being taken out to the outside even after the secure content 21 of the certain content is created.

REFERENCE SIGNS LIST 1 content approving server
2 storage device
3 client
4 filtering server
5 mail server
5 router
6 client
7 LAN
8 Internet
11 secure content creation means
12 content taking-out approving means
21 secure content
22 secure content management file
31 secure content creation requesting means
32 mail transmitting/receiving means
33 outside-taking-out monitoring means
34 portable medium
35 input device
36 display device
37 storage device
38 content
39 secure content
40 filtering means
51 mail transmitting means
71 mail transmitting/receiving means
72 decryption processing means
73 input device
74 display device

The invention claimed is:

1. A content approving apparatus, comprising:
a storage means that stores therein taking-out-permitted-content identification data that comprises hash data generated on the basis of a part or an entirety of each content permitted to be taken out;
a generating means that generates the taking-out-permitted-content identification data; an approving means that determines whether a content is permitted to be taken out with reference to the taking-out-permitted-content identification data; and
a monitoring means that detects that a content is being taken out and queries the approving means as to whether the content is permitted to be taken out, and
wherein the monitoring means, upon detecting that a content is being taken out, generates hash data from the content on a same basis as that upon which the taking-out-permitted-content identification data is generated, and queries the approving means as to whether the content is permitted to be taken out using the hash data, and
wherein the approving means determines whether the content is permitted to be taken out by comparing the queried hash data with the taking-out-permitted-content identification data;
wherein the monitoring means, upon detecting that multiple contents are being taken out simultaneously, generates respective hash data from each of the contents, and queries the approving means as to whether each of the multiple contents is permitted be taken out using the respective hash data for the content, and wherein the approving means, if any of the queried multiple contents is not permitted to be taken out, determines that all of the multiple contents are not permitted to be taken out.

2. The content approving system according to claim 1, wherein the generating means encrypts the content that is permitted to be taken out and generates the taking-out-permitted-content identification data for the encrypted content, and, wherein the monitoring means, upon detecting that a content is being taken out, generates the hash data from the content on a same basis as that upon which the taking-out-permitted-content identification data is generated by the generating means for the encrypted content, and queries the approving means as to whether the content is permitted to be taken out using the hash data.

3. The content approving system according to claim 1, wherein the monitoring means, upon detecting that multiple contents are being taken out simultaneously, generates respective hash data from each of the contents, and queries the approving means as to whether each of the multiple contents is permitted be taken out using the respective hash data for the content, and wherein the approving means individually determines whether each of the multiple content is permitted to be taken out.

4. The content approving system according to claim 1, wherein the monitoring means, upon detecting that a content is being taken out as a data file attached to an e-mail message sent from an e-mail client, generates hash data from the attached data file, and wherein the approving means determines whether the attached data file is permitted to be taken out as the e-mail message is being sent to a recipient of the e-mail message, and, if the attached data is not permitted to be taken out, determines that only a text body of the e-mail message is permitted to be sent to the recipient.

5. The content approving system according to claim 1, wherein the taking-out-permitted-content identification data includes, in addition to the hash data, a data size of the content that is permitted to be taken out, wherein the monitoring means measures a data size of the content that is being taken out, and queries the approving means as to whether the content is permitted to be taken out using the hash data and the measured data size, and wherein the approving means determines whether the content is permitted to be taken out by comparing the queried hash data and the measured data size with the taking-out-permitted-content identification data.

6. The content approving system according to claim 1, wherein the monitoring means detects that a content is being taken out upon the content being moved to an external storage medium or being uploaded to a web server.

* * * * *